(12) United States Patent
Kwon et al.

(10) Patent No.: US 9,965,166 B2
(45) Date of Patent: May 8, 2018

(54) MOBILE TERMINAL AND METHOD OF CONTROLLING THE SAME

(71) Applicant: LG ELECTRONICS INC., Seoul (KR)

(72) Inventors: Yunmi Kwon, Seoul (KR); Hyemi Jung, Seoul (KR); Arim Kwon, Seoul (KR)

(73) Assignee: LG ELECTRONICS INC., Seoul (KR)

(*) Notice: Subject to any disclaimer, the term of this patent is extended or adjusted under 35 U.S.C. 154(b) by 166 days.

(21) Appl. No.: 14/101,024

(22) Filed: Dec. 9, 2013

(65) Prior Publication Data

US 2015/0026613 A1 Jan. 22, 2015

(30) Foreign Application Priority Data

Jul. 19, 2013 (KR) .................. 10-2013-0085414

(51) Int. Cl.
| | |
|---|---|
| *G06F 3/0487* | (2013.01) |
| *G06F 3/0488* | (2013.01) |
| *G06F 3/0484* | (2013.01) |
| *G06F 1/16* | (2006.01) |
| *G06F 3/01* | (2006.01) |

(52) U.S. Cl.
CPC .......... *G06F 3/0488* (2013.01); *G06F 1/1626* (2013.01); *G06F 1/1694* (2013.01); *G06F 3/016* (2013.01); *G06F 3/0487* (2013.01); *G06F 3/04847* (2013.01); *G06F 3/04886* (2013.01); *G06F 2200/1636* (2013.01); *G06F 2200/1637* (2013.01); *G06F 2203/04108* (2013.01)

(58) Field of Classification Search
CPC .................................................... G06F 3/0487
USPC .......................................................... 715/764
See application file for complete search history.

(56) References Cited

U.S. PATENT DOCUMENTS

| | | | | |
|---|---|---|---|---|
| 5,698,834 A | * | 12/1997 | Worthington | ...... G06K 7/10881 |
| | | | | 235/462.45 |
| 6,346,935 B1 | * | 2/2002 | Nakajima | ............. G06F 1/1616 |
| | | | | 345/173 |
| 6,453,020 B1 | * | 9/2002 | Hughes | ................. H04M 3/493 |
| | | | | 379/406.01 |
| 7,562,241 B2 | * | 7/2009 | Nurmi | .................... G06F 1/3215 |
| | | | | 345/173 |
| 8,169,411 B2 | * | 5/2012 | Park | ...................... G06F 3/0416 |
| | | | | 345/173 |
| 8,181,874 B1 | * | 5/2012 | Wan | .................. H04M 1/72522 |
| | | | | 235/435 |
| 8,539,387 B1 | * | 9/2013 | Lin | ....................... G06F 3/0488 |
| | | | | 715/856 |

(Continued)

FOREIGN PATENT DOCUMENTS

EP 2131263 A1 12/2009

*Primary Examiner* — Reza Nabi
*Assistant Examiner* — Daniel Rodriguez
(74) *Attorney, Agent, or Firm* — Birch, Stewart, Kolasch & Birch, LLP

(57) ABSTRACT

Provided is a mobile terminal including a main body of the terminal, a sensing unit that detects a tap on the main body, a controller that, if the tap corresponding to a predetermined condition is applied to the main body, controls at least one function that is executable on the terminal, in which the controller performs at least one control operation, based on a position to which the tap is applied.

9 Claims, 23 Drawing Sheets

(56) References Cited

U.S. PATENT DOCUMENTS

| | | | |
|---|---|---|---|
| 8,676,273 B1* | 3/2014 | Fujisaki | H04M 1/6505 379/142.06 |
| 8,723,986 B1* | 5/2014 | Merrill, Jr. | H04N 5/232 348/207.99 |
| 8,805,690 B1* | 8/2014 | Lebeau | G06F 3/165 704/275 |
| 2002/0077830 A1* | 6/2002 | Suomela | G10L 15/26 704/275 |
| 2006/0265653 A1* | 11/2006 | Paasonen | G06F 3/0485 715/704 |
| 2006/0287864 A1* | 12/2006 | Pusa | G10L 15/26 704/275 |
| 2009/0146962 A1* | 6/2009 | Ahonen | G06F 1/1626 345/173 |
| 2009/0234916 A1* | 9/2009 | Cosentino | A61B 5/0537 709/203 |
| 2009/0244357 A1* | 10/2009 | Huang | H04N 5/23212 348/345 |
| 2009/0254342 A1* | 10/2009 | Buck | G10L 15/222 704/233 |
| 2009/0284482 A1* | 11/2009 | Chin | G06F 3/04883 345/173 |
| 2009/0306980 A1* | 12/2009 | Shin | G06F 1/1624 704/235 |
| 2010/0056220 A1* | 3/2010 | Oh | G06F 1/1616 455/566 |
| 2010/0105364 A1* | 4/2010 | Yang | G06F 17/30663 455/414.1 |
| 2010/0137027 A1* | 6/2010 | Kim | G06F 3/03547 455/556.1 |
| 2010/0138680 A1* | 6/2010 | Brisebois | G06F 1/1626 713/324 |
| 2010/0149129 A1* | 6/2010 | Homma | G06F 1/1626 345/174 |
| 2010/0171753 A1 | 7/2010 | Kwon | |
| 2010/0179864 A1* | 7/2010 | Feldman | G06Q 30/02 705/12 |
| 2010/0241958 A1* | 9/2010 | Fish | G06F 3/04883 715/702 |
| 2010/0273529 A1* | 10/2010 | Oh | G06F 3/038 455/563 |
| 2010/0289760 A1* | 11/2010 | Jonoshita | G06F 1/1626 345/173 |
| 2011/0022196 A1* | 1/2011 | Linsky | G06F 1/163 700/85 |
| 2011/0022393 A1* | 1/2011 | Waller | G01C 21/3608 704/270 |
| 2011/0037734 A1* | 2/2011 | Pance | G06F 3/016 345/177 |
| 2011/0053641 A1* | 3/2011 | Lee | G06F 1/1626 455/556.1 |
| 2011/0080359 A1* | 4/2011 | Jang | G06F 1/1643 345/173 |
| 2011/0316797 A1* | 12/2011 | Johansson | G06F 3/04883 345/173 |
| 2012/0162358 A1* | 6/2012 | Choi | H04M 1/27455 348/36 |
| 2012/0174044 A1* | 7/2012 | Koga | G06F 3/04883 715/863 |
| 2012/0192067 A1* | 7/2012 | DeLuca | G06F 1/1637 715/702 |
| 2013/0028439 A1* | 1/2013 | Mitsufuji | H04R 3/005 381/92 |
| 2013/0057489 A1* | 3/2013 | Morton | G06F 1/169 345/173 |
| 2013/0069897 A1 | 3/2013 | Liu et al. | |
| 2013/0082939 A1* | 4/2013 | Zhao | G06F 1/3218 345/173 |
| 2013/0086522 A1* | 4/2013 | Shimazu | G06F 3/0488 715/810 |
| 2013/0093689 A1* | 4/2013 | Papakipos | G06F 1/1626 345/173 |
| 2013/0100044 A1* | 4/2013 | Zhao | G06F 1/1694 345/173 |
| 2013/0141365 A1* | 6/2013 | Lynn | G06F 3/041 345/173 |
| 2013/0142362 A1* | 6/2013 | Lynn | G06F 3/041 381/109 |
| 2013/0154990 A1 | 6/2013 | Hamada | |
| 2013/0167074 A1* | 6/2013 | Oonishi | G06F 3/0488 715/799 |
| 2013/0169564 A1* | 7/2013 | Sano | G06F 1/1647 345/173 |
| 2013/0191791 A1* | 7/2013 | Rydenhag | G06F 3/017 715/863 |
| 2013/0198435 A1* | 8/2013 | Sandadi | G06F 12/126 711/103 |
| 2013/0215041 A1* | 8/2013 | Kim | G06F 3/0487 345/173 |
| 2013/0215071 A1* | 8/2013 | Pasquero | G06F 1/1684 345/174 |
| 2013/0261871 A1* | 10/2013 | Hobbs | B60K 37/06 701/28 |
| 2013/0305352 A1* | 11/2013 | Narendra | H04M 1/673 726/19 |
| 2013/0321291 A1* | 12/2013 | Sim | G06F 3/0488 345/173 |
| 2013/0321340 A1* | 12/2013 | Seo | G06F 1/1641 345/174 |
| 2013/0325479 A1* | 12/2013 | Krueger | G10L 21/00 704/275 |
| 2013/0328828 A1* | 12/2013 | Tate | G06F 3/044 345/174 |
| 2013/0342480 A1* | 12/2013 | Moon | G06F 3/0488 345/173 |
| 2014/0043259 A1* | 2/2014 | Park | G06F 3/0412 345/173 |
| 2014/0111415 A1* | 4/2014 | Gargi | G06F 3/017 345/156 |
| 2014/0184471 A1* | 7/2014 | Martynov | G06F 3/1423 345/1.2 |
| 2014/0253489 A1* | 9/2014 | Osoinach | G06F 3/041 345/174 |
| 2014/0267913 A1* | 9/2014 | An | H04N 5/4403 348/569 |
| 2014/0281962 A1* | 9/2014 | Won | G06F 3/0482 715/705 |
| 2014/0298220 A1* | 10/2014 | Luu | G06F 3/04883 715/765 |
| 2014/0337769 A1* | 11/2014 | Kim | G06F 3/04847 715/761 |
| 2014/0337791 A1* | 11/2014 | Agnetta | G06F 3/0481 715/784 |
| 2014/0379341 A1* | 12/2014 | Seo | G10L 15/22 704/246 |
| 2015/0006166 A1* | 1/2015 | Schmidt | G10L 15/30 704/231 |
| 2015/0012886 A1* | 1/2015 | Lu | G06F 3/0488 715/835 |
| 2015/0022471 A1* | 1/2015 | Kwak | G06F 1/3265 345/173 |
| 2015/0186109 A1* | 7/2015 | Jarvinen | G06F 3/167 715/728 |
| 2015/0339098 A1* | 11/2015 | Lee | G06F 3/167 715/728 |

* cited by examiner (a)

IF SCREEN IS TURNED OFF DUE TIME OUT →

(b)

(c)

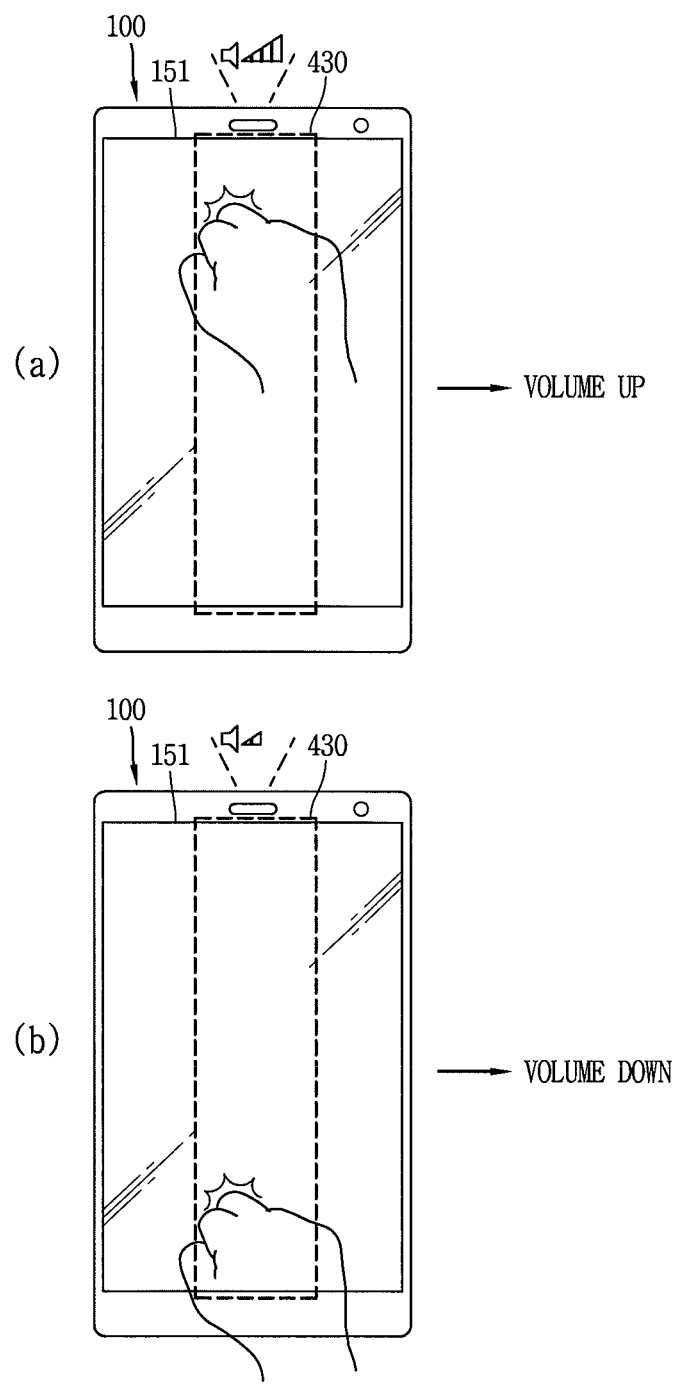

MOBILE TERMINAL AND METHOD OF CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2013-0085414, filed on Jul. 19, 2013, the contents of which is incorporated by reference herein in its entirety.

BACKGROUND OF THE DISCLOSURE

1. Field of the Disclosure

The present invention relates to a mobile terminal that is capable of controlling the mobile terminal using external force and a method of controlling the mobile terminal.

2. Background of the Disclosure

A terminal is broadly categorized by mobility into a mobile terminal and a stationary terminal. The mobile terminal is further categorized by portability into a handheld terminal and a vehicle-mounted terminal.

In response to an increasing demand for diversified functions, the terminal has been realized in the form of a multimedia player with multiple functions such as shooting a photographic object as a still image or moving images, reproducing digital audio and video compression files, playing a game, receiving a broadcast or the like.

Furthermore, structural and software modifications to the mobile terminal are considered for supporting and improving functions of the mobile terminal.

Furthermore, there is an increasing demand for a new user interface that conveniently controls functions of the mobile terminal by performing a simple operation on the terminal or surroundings of the terminal.

SUMMARY OF THE DISCLOSURE

Therefore, an aspect of the detailed description is to provide a mobile terminal that is capable of controlling the terminal only by tapping on a main body of the terminal or surroundings of the terminal and a method of controlling the mobile terminal.

To achieve these and other advantages and in accordance with the purpose of this specification, as embodied and broadly described herein, there is provided a mobile terminal including a main body of the terminal, a sensing unit is that detects a tap on the main body, a controller that, if the tap corresponding to a predetermined condition is applied to the main body, controls at least one function that is executable on the terminal, in which the controller performs at least one control operation, based on a position to which the tap is applied.

In the mobile terminal, if a first tap is detected in which the main body is tapped on a first reference number of times, and then a second tap is detected in which the main body is tapped on a second reference number of times, the controller may perform the at least one control operation.

In the mobile terminal, only if the second tap is detected within predetermined time after the first tap is detected, the controller may perform the at least one control operation, corresponding to the second tap.

In the mobile terminal, corresponding to the second tap, the controller may change setting information relating to a function corresponding to screen information that is output on a display unit, among functions that run currently, and if the first tap is applied, the controller may output guide information on the setting information that is controllable, according to a position to which the second tap is applied.

The mobile terminal may further include a display unit that is located in the main body, in which the sensing unit may be configured in such a manner as to detect the tap on the main body in a state where the display unit is inactivated.

In the mobile terminal, if the tap corresponding to a predetermined condition is applied in the state where the display unit is inactivated, information relating to information that is displayed on the position to which the tap is applied may be displayed on the display unit, among items of initial screen information that are displayed on the display unit when the display unit switches from an inactivated state to an activated state.

In the mobile terminal, the initial screen information may correspond to a locked screen, when the tap is applied to a first region of display regions of the display unit, time information may be displayed, and when the tap is applied to a second region different from the first region of the display regions of the display unit, a home screen page may be output.

In the mobile terminal, if a specific function is being executed in the state where the display unit is inactivated, the controller may control the specific function while maintaining the inactivated state of the display unit, corresponding to the detected tap.

In the mobile terminal, if the tap is detected a predetermined number of times within predetermined time, the controller may change a setting value for any one of the functions that run on the terminal, and the changed setting value may relate to information that is output to and is input from a position that corresponds to the position to which the tap is applied.

The mobile terminal may include a microphone that is located in the main body and configured to receive voice information, and a speaker that is formed on the main body and configured to output audio information, in which in a state where the microphone and the speaker are all activated, when the tap is applied to surroundings of a region in which the microphone is located, the controller changes a setting value associated with the microphone, and when the tap is applied to surroundings of a region in which the speaker is located, the controller changes a setting value associated with the speaker.

In the mobile terminal, the controller may perform control in such a manner that the extent to which the setting value is changed varies depending on strength with which the tap is applied.

In the mobile terminal, the terminal may include multiple input and output constituent elements, and the controller may perform control of whether or not to activate the constituent element located in the position to which the tap on the main body is applied.

In the mobile terminal, if a camera is located in the position to which the tap is applied, the camera may be activated or inactivated, and if a flash is located in the position to which the tap is applied, the flash may be activated or inactivated.

In the mobile terminal, the main body of the terminal may include a front surface in which a display unit is located and a rear surface facing the front surface, and if the tap corresponding to a predetermined condition is applied to the rear surface, the controller may output status information relating to the terminal by voice.

In the mobile terminal, concurrent running of multiple applications on the terminal may be possible, and if the tap corresponding to the predetermined condition is applied to a predetermined region of the main body, the controller may terminate at least one of the running multiple applications.

In the mobile terminal, the controller may sequentially terminate the running multiple applications each time the tap corresponding to the predetermined condition is applied.

In the mobile terminal, the sensing unit may detect the tap on the main body and the tap on an object in which the main body is placed, and when the tap on the object is detected by the sensing unit, the controller may execute a voice recognition function or controls an activated state of a display unit.

In the mobile terminal, when the tap on the object is detected in a state where the display unit is activated, a period of time for which the display unit is activated may be extended.

To achieve these and other advantages and in accordance with the purpose of this specification, as embodied and broadly described herein, there is provided according to another aspect of the present invention, there is provided a method of controlling a mobile terminal, including detecting a first tap in which a main body of the terminal is tapped on a first reference number of times, detecting a second tap in which the main body is tapped on a second reference number of times after the first tap is detected, and controlling at least one function that is executable on the terminal if the second tap is applied within predetermined time after the first tap is detected.

In the method, if a specific function is being executed in a state where a display unit is inactivated, a controller may control the specific function while maintaining the inactivated state of the display unit, corresponding to the second tap.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a mobile terminal according to the present invention will be explained in more detail with reference to the attached drawings. The suffixes attached to components of the wireless speaker, such as 'module' and 'unit or portion' were used for facilitation of the detailed description of the present invention. Therefore, the suffixes do not have different meanings from each other.

The mobile terminal according to the present invention may include a smart phone, a laptop computer, a digital broadcasting terminal, a Personal Digital Assistant (PDA), a Portable Multimedia Player (PMP), a navigation system, a slate PC, a tablet PC, an ultra book, etc. However, it will be obvious to those skilled in the art that the present invention may be also applicable to a fixed terminal such as a digital TV and a desktop computer, except for specific configurations for mobility.

Figure 1:
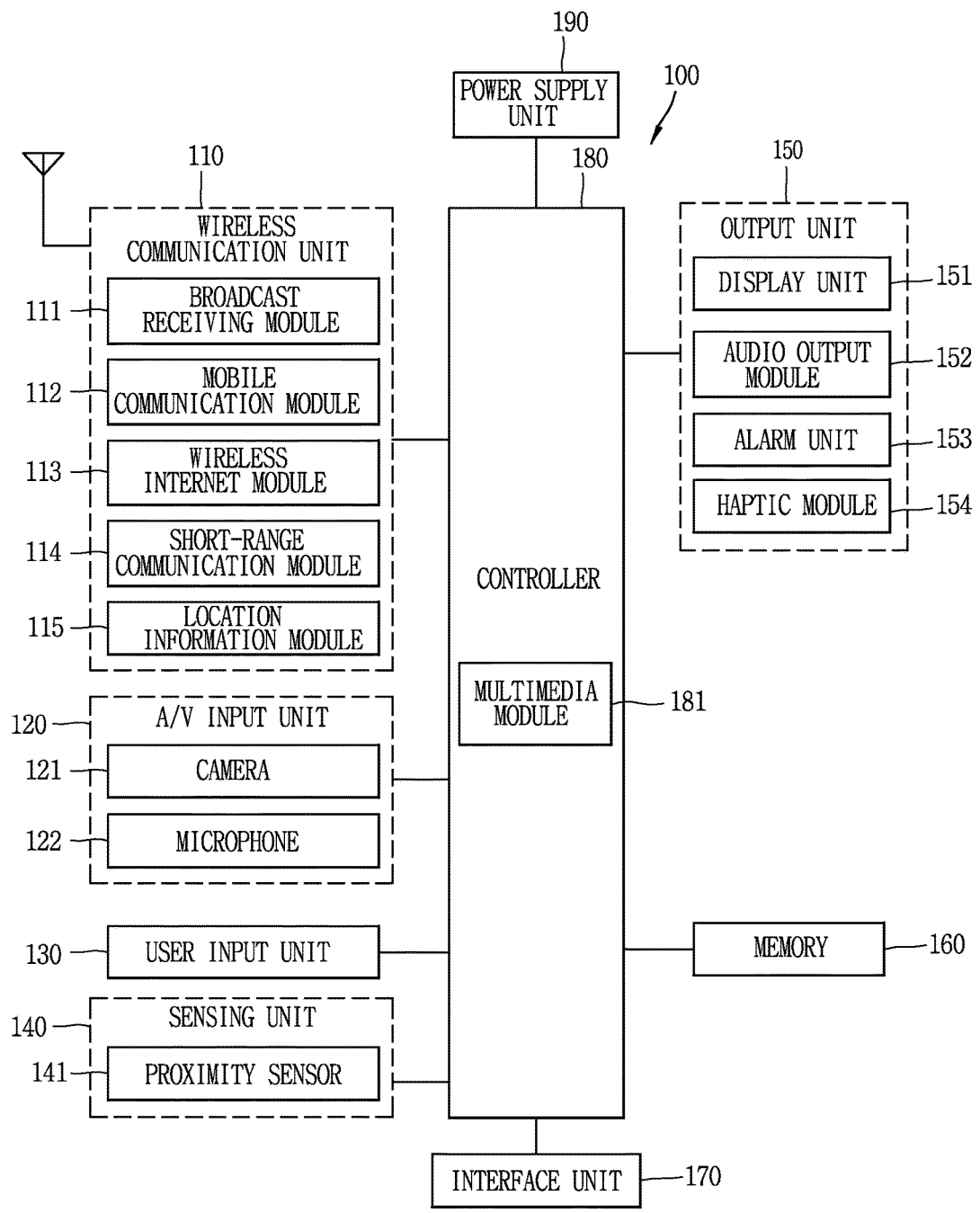
FIG. 1 is a block diagram illustrating a mobile terminal according to one embodiment of the present disclosure.

FIG. 1 is a block diagram of a mobile terminal according to an embodiment of the present invention.

As shown in FIG. 1, the mobile terminal 100 includes a radio communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components.

Hereinafter, each of the above components will be explained.

The radio communication unit 110 typically includes one or more components to authorize radio communication between the mobile terminal 100 and a radio communication unit system or a network in which the mobile terminal 100 is located. For example, the radio communication unit 110 may include a broadcast receiving module 111, a mobile communication module 112, a wireless Internet module 113, a short range communication module 114, a location information module 115, etc.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network. In this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The mobile communication module 112 is configured to implement a video call mode and a voice call mode. The video call mode indicates a call performed while a user views counterpart, whereas the voice call mode indicates a call performed while a user does not view counterpart. For implementation of the video call mode and the voice call mode, the mobile communication module 112 is configured to transmit and receive at least one of voice data and image data.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short range communication module 114 is a module for supporting short range communications. Some examples of short range communication technology include Bluetooth™, Radio Frequency IDentification (RFID), Infrared Data Association (IrDA), Ultra-WideBand (UWB), ZigBee™, Near Field Communication (NFC) and the like.

The location information module 115 is a module for acquiring a location (or position) of the mobile communication terminal. For example, the location information module 115 may include a GPS (Global Positioning System) module.

Referring to FIG. 1, the A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display 151.

The image frames processed by the camera 121 may be stored in the memory 160 or transmitted via the radio communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration motion and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The output unit 150 is configured to provide outputs in a visual, audible, and/or tactile manner (e.g., audio signal, video signal, alarm signal, vibration signal, etc.). The output unit 150 may include the display 151, an audio output module 152, an alarm unit 153, a haptic module 154, and the like.

The display 151 may display information processed in the mobile terminal 100. For example, when the mobile terminal 100 is in a phone call mode, the display 151 may display a User Interface (UI) or a Graphic User Interface (GUI) associated with a call. When the mobile terminal 100 is in a video call mode or image capturing mode, the display 151 may display a captured image and/or received image, a UI or GUI.

The display 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of these displays may be configured to be transparent so that outside may be seen therethrough, which may be referred to as a transparent display. A representative example of this transparent display may include a transparent organic light emitting diode (TOLED), etc. The mobile terminal 100 may include two or more displays 151. The rear surface portion of the display 151 may also be implemented to be optically transparent. Under this configuration, a user can view an object positioned at a rear side of a body through a region occupied by the display 151 of the body.

The display 151 may be implemented in two or more in number according to a configured aspect of the mobile terminal 100. For instance, a plurality of displays may be arranged on one surface integrally or separately, or may be arranged on different surfaces.

Here, if the display 151 and a touch sensitive sensor (referred to as a touch sensor) have a layered structure therebetween, the structure may be referred to as a touch screen. The display 151 may be used as an input device rather than an output device. The touch sensor may be implemented as a touch film, a touch sheet, a touch pad, and the like.

The touch sensor may be configured to convert changes of a pressure applied to a specific part of the display 151, or a capacitance occurring from a specific part of the display 151, into electric input signals. Also, the touch sensor may be configured to sense not only a touched position and a touched area of a touch object, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display 151 has been touched.

Referring to FIG. 1, a proximity sensor 141 may be arranged at an inner region of the mobile terminal covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

The proximity sensor 141 detects a proximity touch and a proximity touch pattern (e.g., a proximity touch distance, a proximity touch speed, a proximity touch time, a proximity touch position, a proximity touch motion state, or the like), and information corresponding to the sensed proximity touch operation and the proximity touch pattern can be output to the touch screen.

The audio output module 152 may output audio data received from the radio communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the mobile terminal 100. The audio output module 152 may include a receiver, a speaker, a buzzer, etc.

The alarm unit 153 outputs a signal for informing about an occurrence of an event of the mobile terminal 100. Events generated in the mobile terminal may include call signal reception, message reception, key signal inputs, and the like. In addition to video or audio signals, the alarm unit 153 may output signals in a different manner, for example, to inform about an occurrence of an event. For example, the alarm unit 153 may output a signal in the form of vibration. The video signal or audio signal may be output through the display 151 or the voice output module 152. Therefore, the display 151 and the voice output module 152 may be categorized as part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be output or sequentially output.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a map data, phonebook, messages, still images, video, etc.) that are input or output. The memory 160 may store data relating to various patterns of vibrations and sounds output when touch input to the touch screen is sensed.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

Here, the identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied therethrough to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Once a preset condition of the mobile terminal is satisfied, the controlled 180 can execute a locked state for limiting a user's input of control commands with respect to applications. And, the controller 180 can control a locked screen displayed in the locked state, based on a touch input sensed by the display 151 in the locked state.

The power supply unit 190 receives external power or internal power and supplies appropriate power required for operating respective elements and components under control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Hereinafter, a structure of the mobile terminal of FIG. 1 according to an embodiment of the present invention will be explained.

Figure 2A:
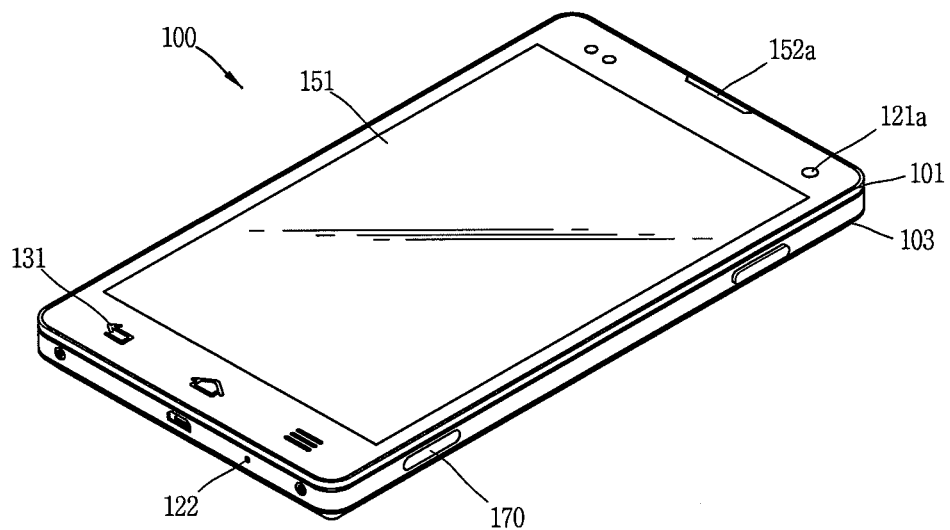
FIGS. 2A and 2B are perspective diagrams illustrating the mobile terminal according to one embodiment of the present invention when viewed from the front side and the rear side, respectively.
Figure 2B:
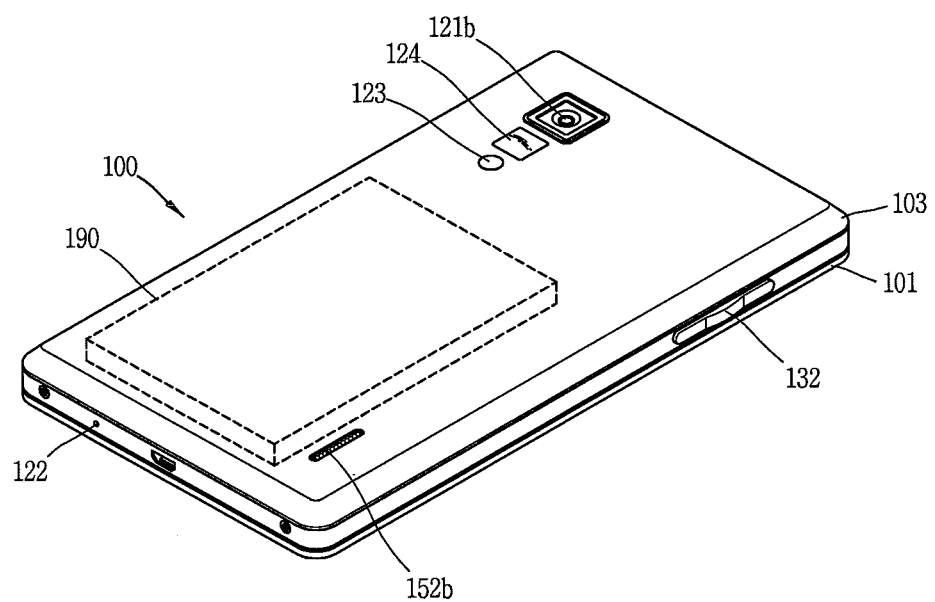

FIG. 2A is a front perspective view of the mobile terminal according to an embodiment of the present invention, and FIG. 2B is a rear perspective view of the mobile terminal according to an embodiment of the present invention.

The mobile terminal 100 according to the present disclosure is a bar type mobile terminal. However, the present disclosure is not limited to this, but may be applied to a slide type in which two or more bodies are coupled to each other so as to perform a relative motion, a folder type, or a swing type, a swivel type and the like.

A body of the mobile terminal 100 has a front surface, side surfaces and a rear surface. The body has two ends in a lengthwise direction.

A case (casing, housing, cover, etc.) forming an outer appearance of the body 100 may include a front case 101 and a rear case 103. A space formed by the front case 101 and the rear case 102 may accommodate various components therein. At least one intermediate case may further be disposed between the front case 101 and the rear case 103.

Such cases may be formed by injection-molded synthetic resin, or may be formed using a metallic material such as stainless steel (STS) or titanium (Ti).

At the front case 101, may be disposed a display 151, an audio output unit 152a, a first camera 121a, user input units 130/131 and 132, a microphone 122, an interface unit 170, etc.

The display 151 occupies most parts of a main surface of the front case 101. The audio output unit 152a and the first camera 121a are arranged at a region adjacent to one end of the stereoscopic display 151, and the user input unit 131 and the microphone 122 are arranged at a region adjacent to another end of the display 151. The user input unit 131, the interface unit 170, etc. may be arranged on side surfaces of the front case 101 and the rear case 103. The microphone 122 is disposed at another end of the body 100.

The user input unit 130 is manipulated to receive a command for controlling the operation of the mobile terminal 100, and may include a plurality of manipulation units 131 and 132. The manipulation units may be referred to as manipulating portions, and may include any type of ones that can be manipulated in a user's tactile manner.

Commands inputted through the first or second user input units 131 and 132 may be variously set. For instance, the first manipulation 131 is configured to input commands such as START, END, SCROLL or the like, and the second manipulation unit 132 is configured to input commands for controlling a level of sound outputted from the audio output unit 152, or commands for converting the current mode of the display 151 to a touch recognition mode.

Referring to FIG. 2B, an audio output unit 152' may be additionally disposed at the rear case 103. The audio output unit 152' may implement a stereo function together with the audio output unit 152b (refer to FIG. 2A), and may be used for calling in a speaker phone mode.

A power supply unit 190 for supplying power to the mobile terminal 100 is mounted to the body. The power supply unit 190 may be mounted in the body, or may be detachably mounted to the body.

A touch pad 135 for sensing touch may be additionally mounted to the rear case 103. Like the display 151, the touch pad 135 may be formed to be light-transmissive. In this case, if the display 151 is configured to output visual information from two surfaces thereof, the visual information can be recognized through the touch pad 135. The information output from the two surfaces can be controlled by the touch pad 135. Alternatively, a display may be additionally mounted to the touch pad 135, so that a touch screen can be disposed at the rear case 103.

A second camera 121b may be additionally provided on the rear case 103. The second camera 121b faces a direction which is opposite to a direction faced by the first camera 121a (refer to FIG. 2A), and may have different pixels from those of the first camera 121a.

For example, the first camera 121a may operate with relatively lower pixels (lower resolution). Thus, the first camera 121a may be useful when a user can capture his face and send it to another party during a video call or the like. On the other hand, the second camera 121b may operate with a relatively higher pixels (higher resolution) such that it can be useful for a user to obtain higher quality pictures for later use. The cameras 121a and 121b may be installed at the body 100 so as to rotate or pop-up.

A flash 123 and a mirror 124 may be additionally disposed adjacent to the second camera 121b. The flash 123 operates in conjunction with the second camera 121b when taking a picture using the second camera 121b. The mirror 124 can cooperate with the second camera 121b to allow a user to photograph himself in a self-portrait mode.

An audio output unit 152b may be additionally arranged on a rear surface of the body. The audio output unit 152a (refer to FIG. 2A) may cooperate with the audio output unit 152a (refer to FIG. 2A) so as to implement a stereo function. Also, the audio output unit may be configured to operate as a speakerphone.

A power supply unit 190 for supplying power to the mobile terminal 100 is mounted to the body. The power supply unit 190 may be mounted in the body, or may be detachably mounted to the body.

The touch pad 135 operates in association with the display 151 of the front case 101. The touch pad 135 may be disposed on the rear surface of the display 151 in parallel. The touch pad 135 may have a size equal to or smaller than that of the display 151.

In addition, in the mobile terminal according to one embodiment of the present invention, which is capable of at least one or more of the constituent elements described above, functions of the mobile terminal are controlled corresponding to a tap (or a tap gesture with respect to an object) on a main body of the mobile terminal or on an object in which such a main body is placed. That is, in the mobile terminal according to one embodiment of the present invention, the function or an application that is being executed on the mobile terminal, corresponding to the tap, is controlled. In addition, although not currently executed on the mobile terminal according to one embodiment of the present invention, the function that is executable or drivable is executed on the same mobile terminal is executed. Therefore, even though the user does not apply a separate operation (for example, a touch input) to the mobile terminal, he/she can control at least one of the functions that are executable on the mobile terminal, with a simple gesture that performs the tap on the object.

Figure 3:
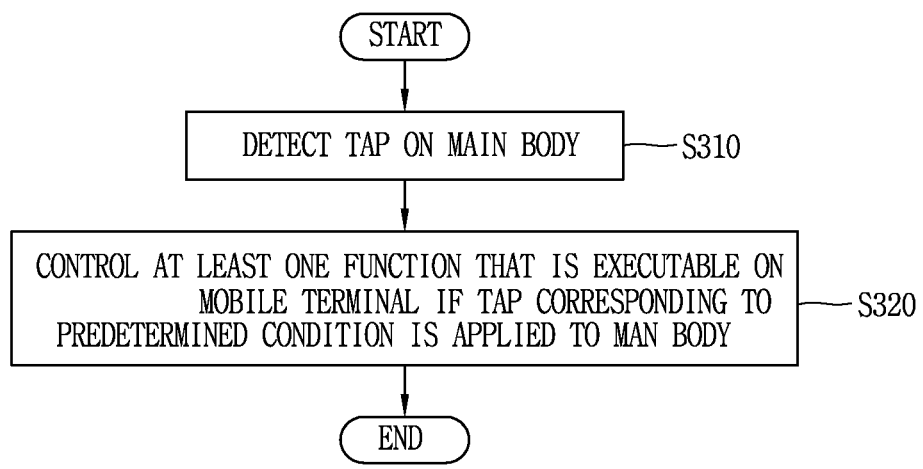
FIG. 3 is a flowchart for describing a method of controlling the mobile terminal according to one embodiment of the present invention.

The mobile terminal that is capable of providing a new user interface, based on the tap gesture that performs the tap on the object, and a method of controlling the same mobile terminal are described in detail below referring to the accompanying drawings. FIG. 3 is a flowchart for describing the method of controlling the mobile terminal according to one embodiment of the present invention.

Referring to FIG. 3, a step of detecting the tap on the main body proceeds in the mobile terminal according to the present invention (S310).

At this point, the tap or the tap gesture means a gesture that performs the tap on the main body 100 of the mobile terminal or on the object. More specifically, the tap is construed to mean a motion of hitting the main body 100 of the mobile terminal or the body lightly with a tapping instrument such as a finger or a motion of lightly bringing the tapping instrument into contact with the main body 100 of the mobile terminal or the object.

On the other hand, the tapping instrument with which the tap is applied is a thing that applies an external force to the main body 100 of the mobile terminal or the object, such as the finger, stylus pen, a pen, a pointer, and a fist. On the other hand, the tipping instrument is not necessarily limited to the thing that can be applied to the mobile terminal according to the present invention, and any type of thing may be possible to use as long as it can apply the external force to the main body 100 of the mobile terminal or the object.

On the other hand, the object to which the tap gesture is applied includes at least one of the main body of the mobile terminal and the object in which the mobile terminal is placed.

On the other hand, in the step of detecting the tap, only if the tap is applied at least two times or more within reference time, it is determined that the "tap" is sensed for the purpose of controlling the mobile terminal. For example, if the tap is applied one time to the display unit 151 with a touching instrument that can be brought into contact with the display unit 151, the controller 180 recognizes a one-time tap as a touch input. That is, in this case, the controller 180 does not control a function corresponding to the one-time tap, but controls a function (for example, a function of selecting an icon that is output to a point to which the touch input is applied) according to the touch input corresponding to the one-time tap.

Therefore, only if the tap that is applied at least two times or more (or multiple times) consecutively within the reference time, the controller 180 determines that the "tap" for controlling at least one or more of the functions is sensed by the sensing unit 140 (or the detection unit).

That is, the tap gestures mean that the tap gesture is to be sensed at least two times or more consecutively within the reference time. Therefore, the sensing of the "tap" hereinafter means that the tapping is applied substantially multiple times to the main body of the terminal or the object.

Furthermore, only if the tap is sensed within the reference time and additionally is applied within a "predetermined region," the controller 180 determines that the "taps" are sensed. For example, the tap means that the tapping is to be applied multiple times consecutively with the predetermined region within the reference time.

On the other hand, at this point, the reference time is a very short period of time, and for example, may be in a range of 300 ms to 2 s. In addition, the predetermined region means a narrow region in which points to which the tap gestures are applied are the same or are regarded as being the same.

To do this, when detecting that the main body of the terminal or the object is tapped on for the first time, the sensing unit 140 calculates the predetermined region from the point in which the first-time tapping is detected. Then, when within the reference time after the first-time tapping is detected, the next-time tapping is detected in succession to the first-time tapping, the sensing unit 140 or the controller 180 determines that the tap is sensed.

On the other hand, the reference time and the predetermined region that are described above can be variably modified according to embodiments.

On the other hand, according to the present invention, the tap is sensed by at least one of an acceleration sensor and a touch sensor that are included in the sensing unit 140. At this point, the acceleration sensor is a sensor that is capable of measuring dynamic forces, such as acceleration, vibration, and impact, which are applied to the main body of the terminal.

That is, the acceleration sensor detects a movement (or vibration) of the main body of the terminal, which occurs due to the tap gesture, and thus detects whether the tap is applied to the object. Therefore, the acceleration sensor detects the tap on the object that is positioned as close to the main body of the terminal as the tap on the main body of the terminal can be detected or as an occurrence of the movement or the vibration of the main body of the terminal can be detected.

In this manner, as long as the detection of the movement or the vibration of the main body of the terminal is possible, the acceleration sensor detects not only the application of the tap to the main body of the terminal, but also detects the application of the tap to points other than the main body.

On the other hand, the mobile terminal according to the present invention operates in a specific mode in which a minimum amount of electric current or electric power is consumed even in a locked state. The specific mode is referred to as a doze mode. Therefore, in the mobile terminal according to the present invention, the touch corresponding to the tap that is applied to the main body of the terminal is detected through the use of the touch sensor, or the tap on the main body of the terminal or on the object in the vicinity of the main body of the terminal is detected, in a state where illumination of the display unit 151 is off or in the doze mode.

In the mobile terminal according to the present invention, in order to detect the tap on the mobile terminal, only one of the acceleration sensor and the touch sensor is used or the acceleration sensor and the touch sensor are sequentially used, or the acceleration sensor and the touch sensor are used at the same time. On the other hand, a mode in which only the acceleration sensor is used to detect the tap is referred to as a first mode, a mode in which the touch sensor is used to detect the tap is referred to as a second mode, and a mode in which the acceleration sensor and the touch sensor are all utilized (at the same time or sequentially) to detect the tap is referred to as a third mode or a hybrid mode.

On the other hand, if the tap is detected through the use of the touch sensor, it is possible to more accurately recognize a position to which the tap is applied is.

In this manner, when it is detected that the main body of the terminal or the object that is positioned at a point that is out of the main body of the terminal is tapped on, a step of controlling at least one of the functions that are executable on the terminal proceeds (S320). That is, if the tap corresponding to a predetermined condition is applied to the main body of the terminal or the object that is positioned at the point that is out of the main body of the terminal, the controller 180 controls at least one of the functions that are executable on the terminal.

At this point, the functions that are executable on the terminal mean all types of functions that are executable or drivable on the mobile terminal. For example, one of the functions that are executable may be an application that is installed on the mobile terminal. For example, "executing of an arbitrary function" means "executing or running of an arbitrary application."

As another example, a function that is executable on the mobile terminal may be a function of receiving an event. At this point, an event that is received is a message receiving event, a call receiving event and the like. On the other hand, the event may be an event that occurs in an application that is installed on the mobile terminal.

As another example, the function that is executable on the mobile terminal may be a function necessary for basic driving of the mobile terminal. For example, as the necessary function for the basic driving, there is a function of turning on and off illumination of the display unit 151, a function of switching the mobile terminal from an unlocked state to a locked state or from the locked state to the unlocked state, a function of setting a communication network, a function of changing setting information on the mobile terminal, and the like.

In this manner, according to the present invention, if the tapping on the main body of the mobile terminal or on the point that is out of the main body of the mobile terminal corresponds to a predetermined condition, the controller 180 controls at least one of the functions that are executable on the mobile terminal.

On the other hand, at this point, the predetermined condition relates to at least one of the number of times that the tap is applied, the position to which the tap is applied, the speed at which the tap is applied, the strength with which the tap is applied, the pattern in which the tap is applied, and the region to which the tap is applied. For example, only if the tap is applied "three times," the controller 180 controls at least one of the executable functions described above.

In addition, the predetermined condition is that after a first tap is detected in which the main body or the object is tapped on by a first reference number of times or is tapped on by the first reference number of times or greater, a second tap should be detected in which the main body or the object is tapped on by a second reference number of times or is tapped on by the second reference number of times or greater.

That is, the controller 180 makes the terminal prepared in a ready state (or activated state), corresponds to the detecting of the first tap, and when the second tap is applied, controls accordingly the terminal. That is, the user can transfer a notification that the mobile terminal is controlled using the tap, to the mobile terminal by applying the first tap.

On the other hand, in the mobile terminal according to the present invention, the first tap is detected through the use of the acceleration sensor, and the second tap is detected through the use of the touch sensor. That is, the controller 180 makes the terminal prepared in the ready state through the use of the acceleration sensor in the doze mode, and according to the second tap applied thereafter, controls the mobile terminal.

On the other hand, only if the second tap is detected within predetermined time after the first tap is detected, the controller 180 performs at least one control operation, corresponding to the second tap. That is, only if the second tap is detected within the predetermined time after the first tap is detected, the controller 180 recognizes the second tap as being valid, and thus recognizes whether the user desires to control the mobile terminal or whether the user applies the tap by mistake.

At this point, the first reference number of times and the second reference number of times are the same or are different from each other. For example, the first reference number of times may be three, and the second reference number of times may be two. As another example, the first reference number of times and the second reference number of times may be both two or greater.

On the other hand, the controller 180 can change setting information relating to a function that run currently, or to a function corresponding to screen information that is output on the display unit, among functions that run currently, in which case, the controller 180 outputs guide information on the setting information that is controllable depending on a position to which the second tap is applied, on the display unit.

On the other hand, at this point, a function that is controlled corresponding to the tap with respect to the main body or the point (or the object in which the main body is placed) that is out of the main body varies depending on a current status of the mobile terminal or depending on a property of the tap.

First, the status of the mobile terminal is described in detail. When the tap is detected, the controller 180 performs different control operations, depending on the status of the mobile terminal, such as a function that runs currently, a type of screen information that is currently displayed on the display unit 151, an application that corresponds to the screen information that is currently output on the display unit, a state where the display unit 151 is on/off, or a locked/unlocked status of the mobile terminal.

More specifically, even though the same tap is detected, in the state where the illumination of the display unit 151 is off, the controller 180 executes a "voice recognition function." And in the state where the illumination of the display unit 151 is on, the controller 180 executes control over an application associated with the screen information that is currently output, or when the currently-output screen information is a locked screen, cancels the locked state and outputs a home screen page on the display unit 151.

In addition, the function that is executable corresponding to the tap with respect to the main body and the point (the object in which the main body is placed) that is out of the main body is to change a setting for the function that runs on the mobile terminal, to change a setting for the application associated with the screen information that is output to the mobile terminal, or to change a setting for the function that corresponds to the screen information that is output to the mobile terminal.

Next, the property of the tap is described. The controller 180 controls a different function, based on the position to which the tap is applied, the constituent element (the microphone, the speaker and the like) that is located in the position to which the tap is applied, the strength of the tap, the speed of the tap, the area of the tap, and the pattern of the tap.

A method of controlling the mobile terminal according to the control method described referring to FIG. 3 is described in detail below referring to the accompanying drawings.

Figure 4A:
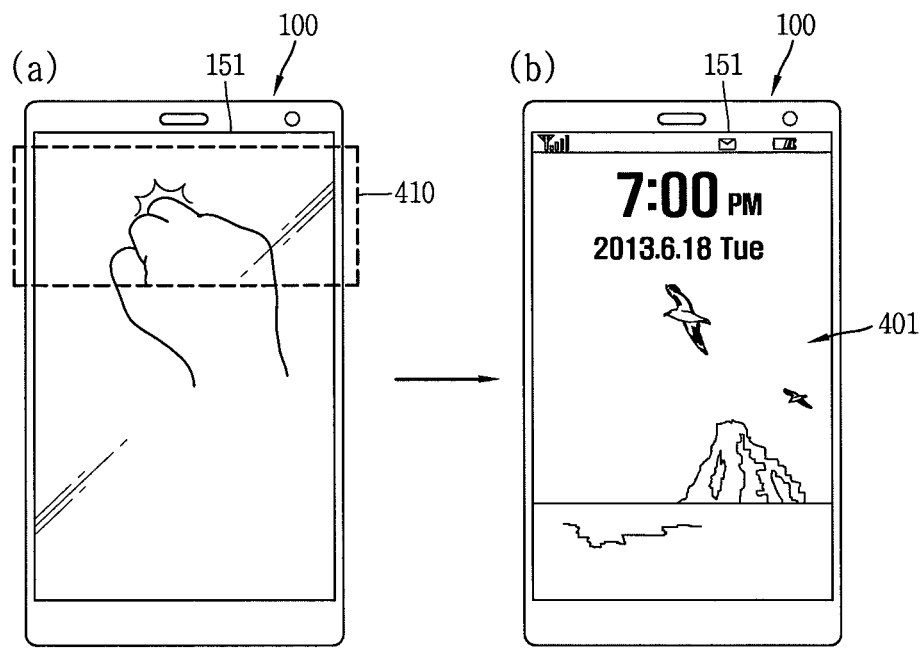
FIGS. 4A(a) and 4A(b), FIGS. 4B(a) and 4B(b), FIGS. 4C(a) to 4C(c), FIGS. 4D(a) and 4D(b), FIGS. 4E(a) and 4E(b), FIGS. 4F(a) to 4F(c), FIGS. 4G(a) and 4G(b), and FIGS. 4H(a) and 4H(b) are diagrams for describing the control method illustrated in FIG. 3.

First, a method of controlling the mobile terminal corresponding to the tap in a state where the display unit 151 is inactivated (or in an off state) is described. FIGS. 4A(a) and 4A(b), FIGS. 4B(a) and 4B(b), FIGS. 4C(a) to 4C(c), FIGS. 4D(a) and 4D(b), FIGS. 4E(a) and 4E(b), FIGS. 4F(a) to 4F(c), FIGS. 4G(a) and 4G(b), FIGS. 4H(a) and 4H(b), and FIGS. 5A and 5B are diagrams for describing the control method illustrated in FIG. 3.

In the mobile terminal according to the present invention, it is detected that the main body of the mobile terminal or the object is tapped on also in the state where the display unit 151 is inactivated (or in the off state). In this manner, if the main body of the mobile terminal or the object is tapped on in the state where the display unit 151 is inactivated, the controller 180 switches the display unit 151 to the activated state. That is, the controller 180 turns on the illumination of the display unit 151, corresponding to the detecting of the tap. In this case, if the mobile terminal is in the locked state, a lock screen is displayed on the display unit 151.

In addition, various items of information are output according to the activation of the display unit 151. The controller 180 outputs different information according to a position in which the display unit 151 is tapped on. For example, as illustrated in FIG. 4A(a), when the tap is applied to a region 410 (a position of the region may vary from one mobile terminal to another) of the lock screen, on which time information is displayed, the controller 180 turns on the illumination of the display unit 151 and as illustrated in FIG. 4A(b), outputs screen information 401 specific to the time information. Such setting information involves outputting of various items of time information such as current time information and world time information. In addition, the mobile terminal is in the locked state in a state where the setting information 401 is output. Therefore, in this case, the user can switch the locked state to the unlocked state using the touch with respect to the display unit 151.

Figure 4B:
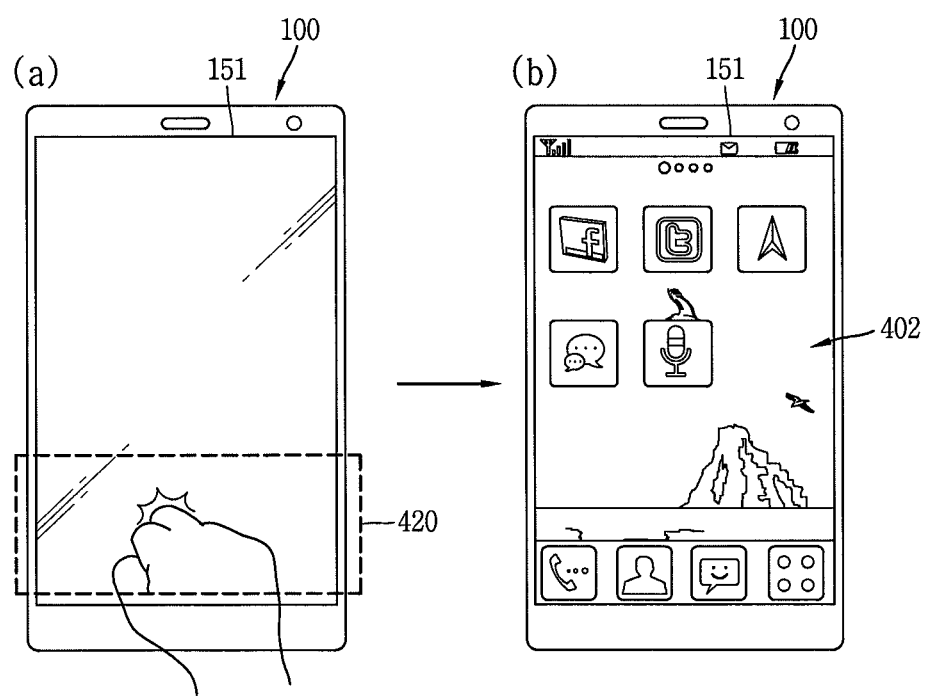
Figure 5:
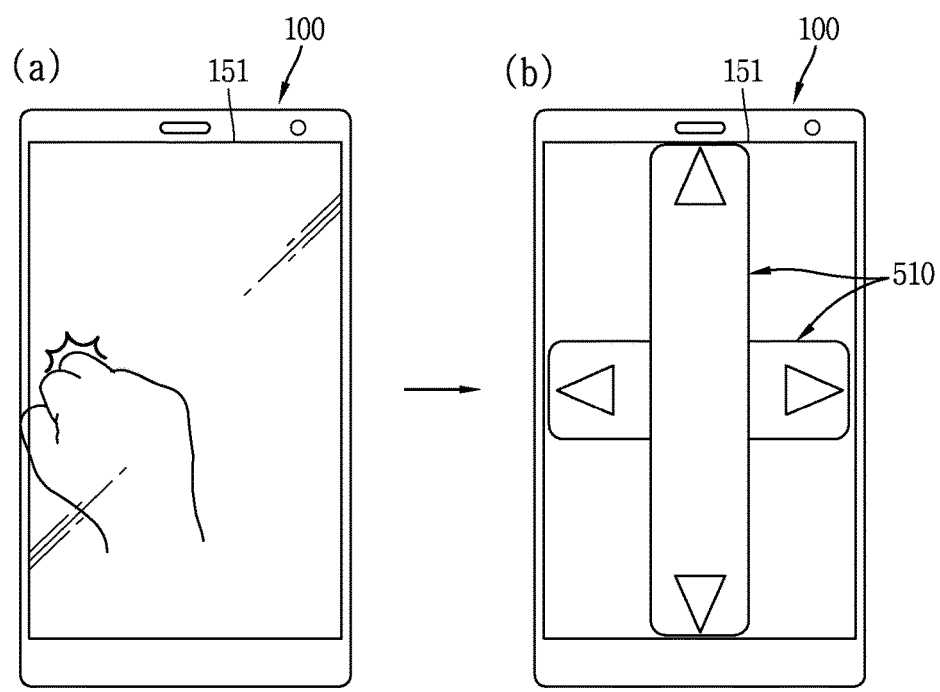
FIGS. 5A and 5B are diagrams for describing the control method illustrated in FIG. 3.

In addition, as another example, when the tap, as illustrated in FIG. 4B(a), is applied to a region 420 that corresponds to a position in which a home button (not illustrated) is located, the controller 180, as illustrated in FIG. 4B(b), immediately switches the locked state to the unlocked state and outputs a home screen page 402. On the other hand, when switching to the locked state, a screen that is first output may not be necessarily the home screen page 402. For example, when switching to the unlocked state, the screen that is to be first output on the display unit 151 may be screen information that has been output on the display unit 151 most recently before the switching to the locked state is performed.

On the other hand, at this point, regardless of the function being executed on the mobile terminal, the home button is pushed down (or selected) to output the home screen page on the display unit 151. That is, when the home button is pushed down or touched on, the controller 180 outputs the home screen page on the display unit 151. On the other hand, even though the home button is pushed down, when the mobile terminal is in the locked state, the home screen page may not be output. In addition, the home button is realized as a hardware key or a virtual key.

On the other hand, corresponding to the tap on the region in which a different functional key (for example, a volume key or a power on/off key) is located without a limitation to the embodiment in which a position where the home button is located is tapped on, the controller 180 controls a function that corresponds to the functional key.

Figure 4C:
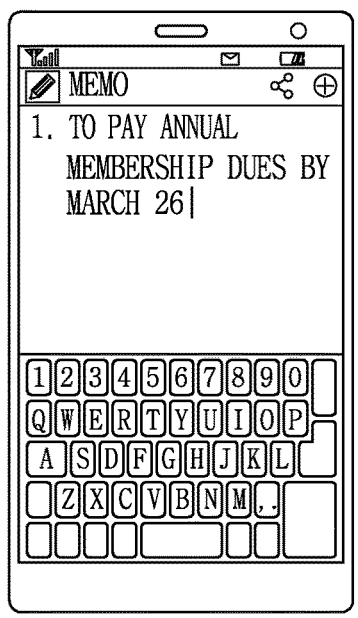
Figure 4C:
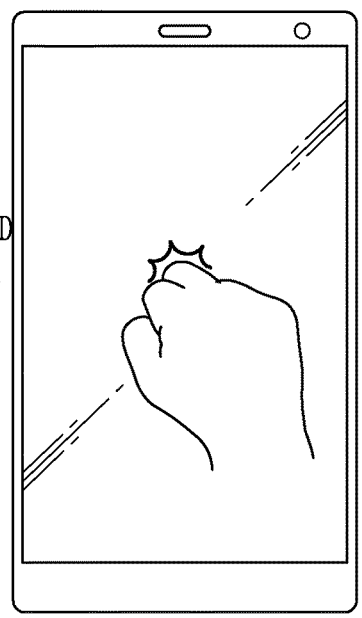
Figure 4C:
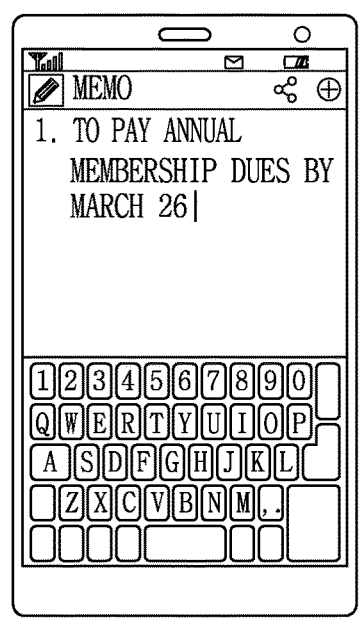

In addition, in the mobile terminal according to the present invention, a control command, as illustrated in FIG. 4C(a), is not applied to the mobile terminal for predetermined time while an arbitrary function (for example, a memo-functioning application) is executed, the illumination of the display unit 151, as illustrated in FIG. 4C(b), is turned off (in this case, a description that the "illumination of the display unit 151 is turned off due to time out" is provided). In this case, when the main body 100 or the object is tapped on, the controller 180, as illustrated in FIG. 4C(c), outputs back the screen information that has been output before the illumination is turned off.

On the other hand, when the arbitrary function, as illustrated in FIG. 4C(a), is in the activated state, for example, in a state where a letter inputting function is activated in the memo-functioning application, the controller 180, as illustrated in FIG. 4C(c), activates the arbitrary function (for example, the letter inputting function) in the same manner.

As another example, if a specific function is executed on the mobile terminal in a state where the illumination of the display unit 151 is turned off (this case is referred to as the locked state), the controller 180 controls the specific function, corresponding to the detecting of the tap in the state where the illumination of the display unit 151 is turned off.

Figure 4E:
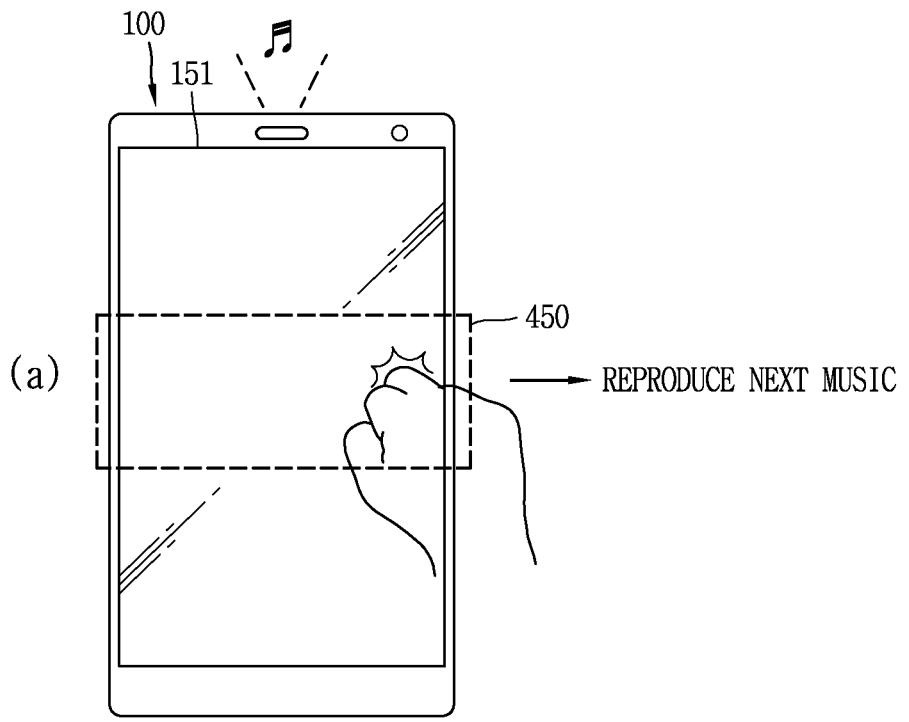
Figure 4E:
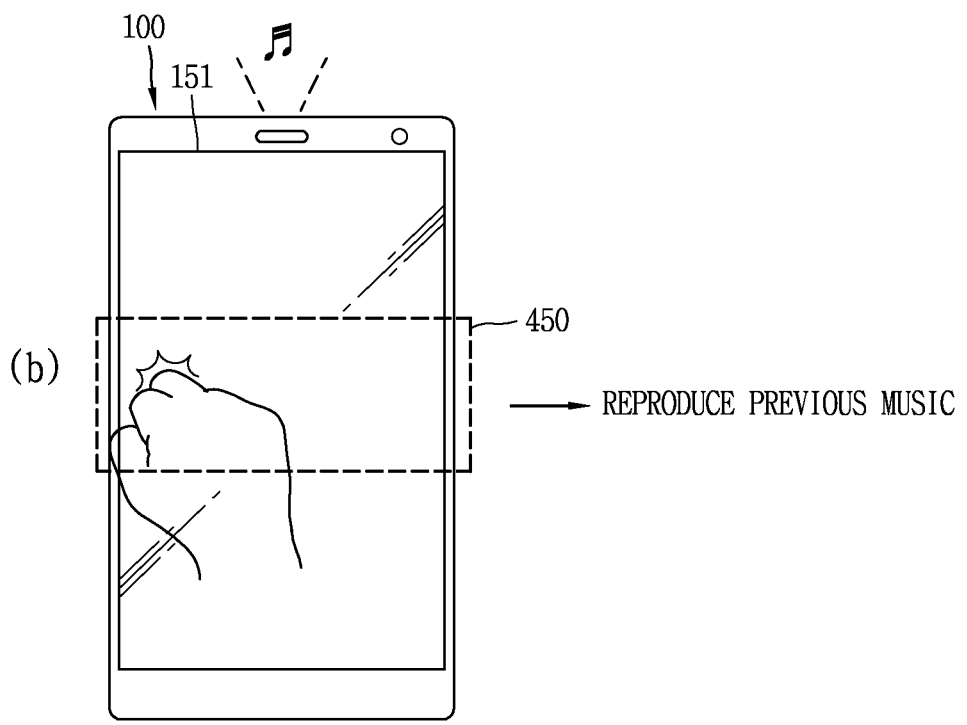

For example, a music-reproducing function, as illustrated in FIGS. 4D(a) and 4D(b) and FIGS. 4E(a) and 4E(b), is executed in the state where the illumination of the display unit 151 is turned off, the controller 180 controls the music-reproducing function, corresponding to the tap applied to the display unit 151. For example, corresponding to the tap applied to the main body of the terminal or the object, the controller 180 adjusts sound (or volume) of music being reproduced, or switches the music being reproduced to other music. Furthermore, the controller 180 controls a music reproducing function in various ways according to the position to which the tap is applied.

For example, the upper portion of one region 430 of the display play 151, as illustrated in FIG. 4D(d), is tapped on, the controller 180 increases volume (or an amount of sound). In addition, if the lower portion of the one region 430, as illustrated in FIG. 4D(b), is tapped on, the controller 180 increases the volume.

Furthermore, if the right side of a different region 450 at least one portion of which is different from the one region 430 described referring to FIG. 4D(a), as illustrated in FIG. 4E(a), is tapped on, the controller 180 switches directly to music to be reproduced in succession to the music being currently reproduced. Then, if the left side of the different region 450 at least one portion of which is different from the one region 430 described referring to FIG. 4D(a), as illustrated in FIG. 4E(b), is tapped on, the controller 180 reproduces back the music that was reproduced before the music being currently reproduced is reproduced.

In this manner, in the mobile terminal according to the present invention, different control operations are performed depending on the taps that are applied to different positions. In addition, the different positions are positions that normally is recognized in a conceptional manner, and because of this, the controller 180 can provide the user with more-friendly user experience (UX).

In addition, when the first tap is detected as illustrated in FIG. 5A, the controller 180 outputs guide information 510 on the function to be controlled according to the applying of the second tap, as illustrated in FIG. 5B. The guide information is guide information on the position to which the second tap is applied or information on the function that is to be controlled according to the second tap. In addition, the guide information is output in at least one of visual, audio, and haptic ways.

On the other hand, the controller 180 controls only the music reproduction function while continuously illuminating the display unit 151. In this manner, if a specific function is being executed in the state where the display unit is inactivated, corresponding to the detected tap, the controller 180 controls the specific function while maintaining the inactivated state of the display unit. Therefore, electric power that is consumed to activate the illumination of the display unit 151 is reduced.

Figure 4F:
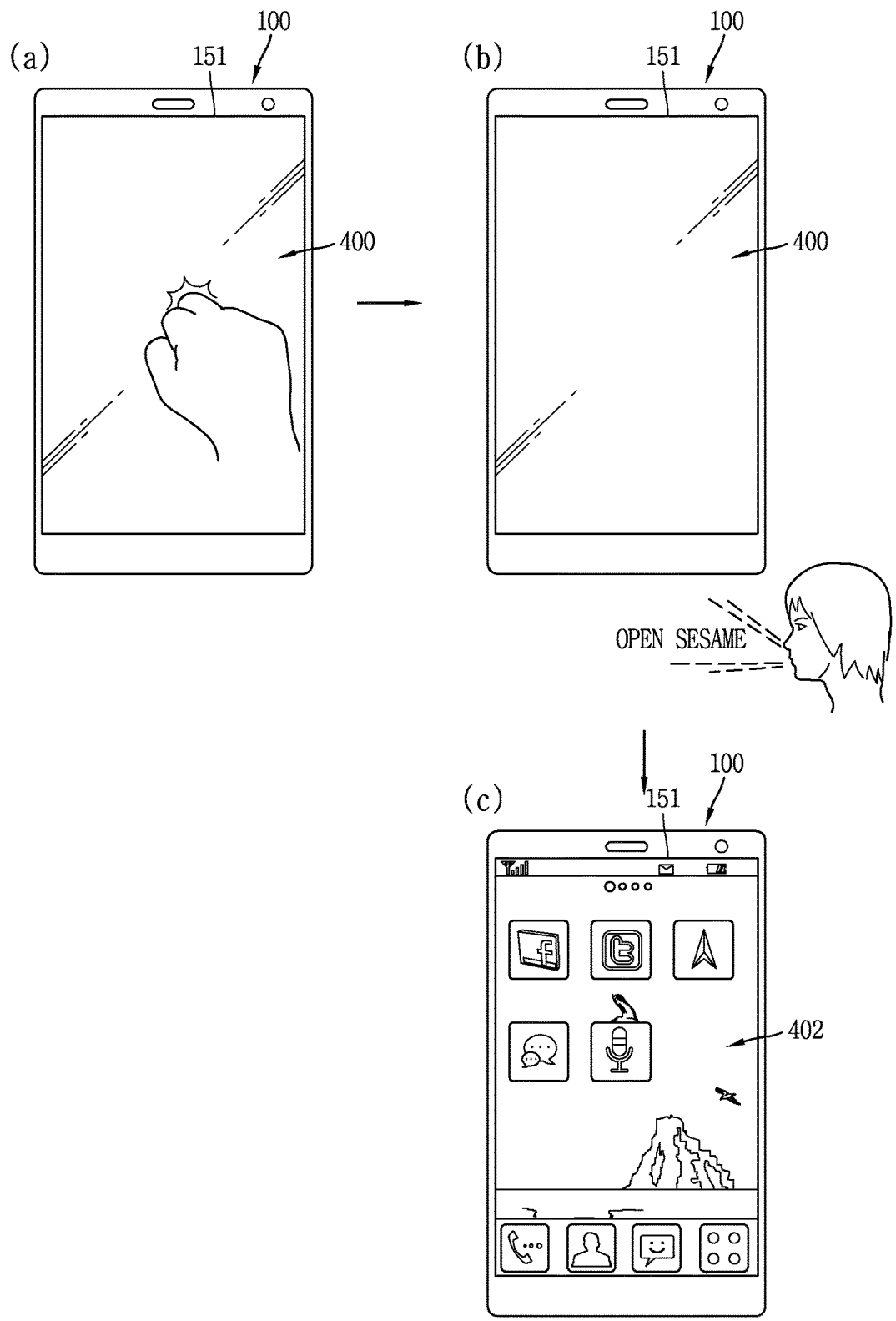

On the other hand, in a different mobile terminal according to one embodiment of the present invention, when the tap, as illustrated in FIG. 4F(a), is applied in the state where the display unit 151 is inactivated, the voice recognition function, as illustrated in FIG. 4B(b) is activated. Therefore, corresponding to a voice command that is input from the user, the controller 180 activates, executes, or performs a function associated with the voice command.

For example, when the voice command (for example, "Open Sesame") that cancels the locked state, as illustrated in FIG. 4B(b), is recognized, the controller 180, as illustrated in FIG. 4F(c), switches the locked state to the unlocked state and turns on the illumination of the display unit 151.

On the other hand, alarm information that notifies that the voice recognition function is activated is output in at least one of the visual, audio, and haptic ways. On the other hand, when visual alarm information has to be output, the controller 180 outputs the visual alarm information by activating one portion of the display unit 151.

On the other hand, when the property of the detected tap corresponds to a predetermined condition, the controller 180 performs a function that is, in advance, matched to the applied tap. For example, when the tap with a first property is detected, the controller 180 performs a first function that is matched to the tap with the first property, and when the tap with a second property different from the first property is detected, performs a second function that is matched to the tap with the second property. In addition, the first or second function is performed only if the status of the mobile terminal satisfies a specific condition. For example, if the first function is set in such a manner that only if the tap with the first property is detected in the locked state, the first function is performed, the controller 180 may not perform the first function even though the tap with the first property is detected in the unlocked state.

Figure 4G:
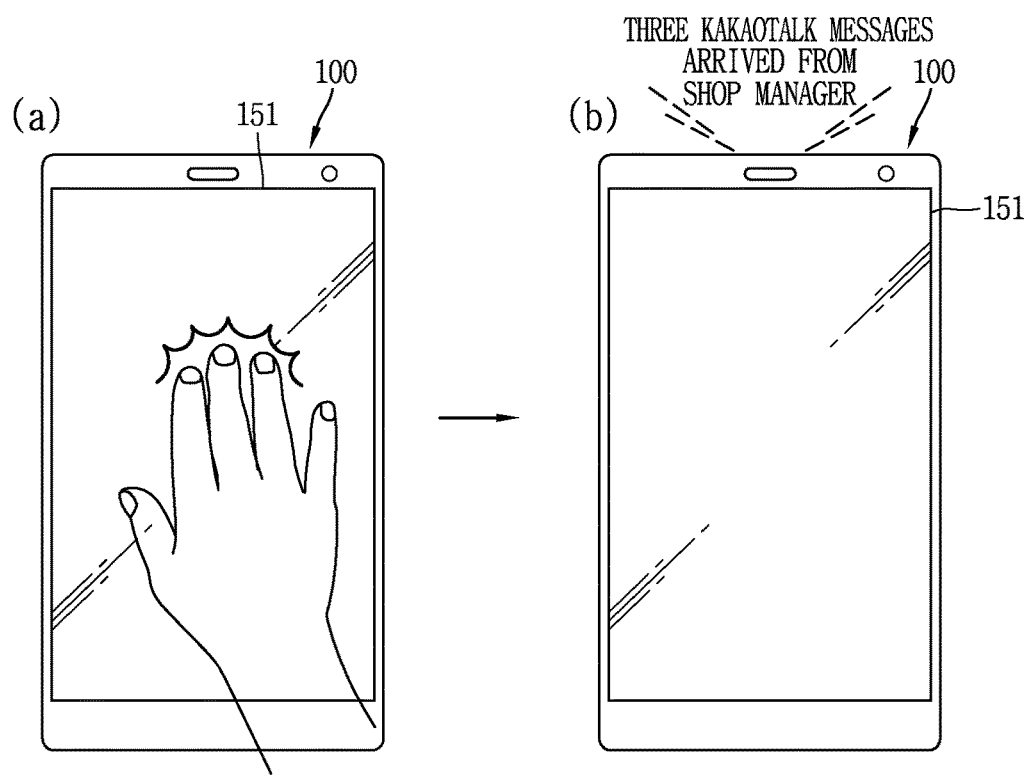

As one example, the tap with the first property may be a tap with respect to a predetermined area or above. When the tap with respect to the predetermined area, as illustrated in FIGS. 4G (a) and 4G(b) is detected on the display unit 151, the controller 180 performs a function that is matched to the first property. At this point, the function that is matched to the first property may be a function of outputting status information by voice. Therefore, corresponding to the detecting of the tap with the predetermined area or above, the controller 180 outputs the status information (for example, event receiving information, current time information, weather information, and status information on the mobile terminal (information on battery, communication status, location and others)). On the other hand, even though it is detected that the tap is applied to the predetermined area or above, when the status of the mobile terminal does not satisfy a predetermined condition (for example, a condition that the illumination of the mobile terminal should be in an off state, or a condition that the mobile terminal should be in the locked state), the controller 180 does not perform the function that is matched to the first property.

Figure 4H:
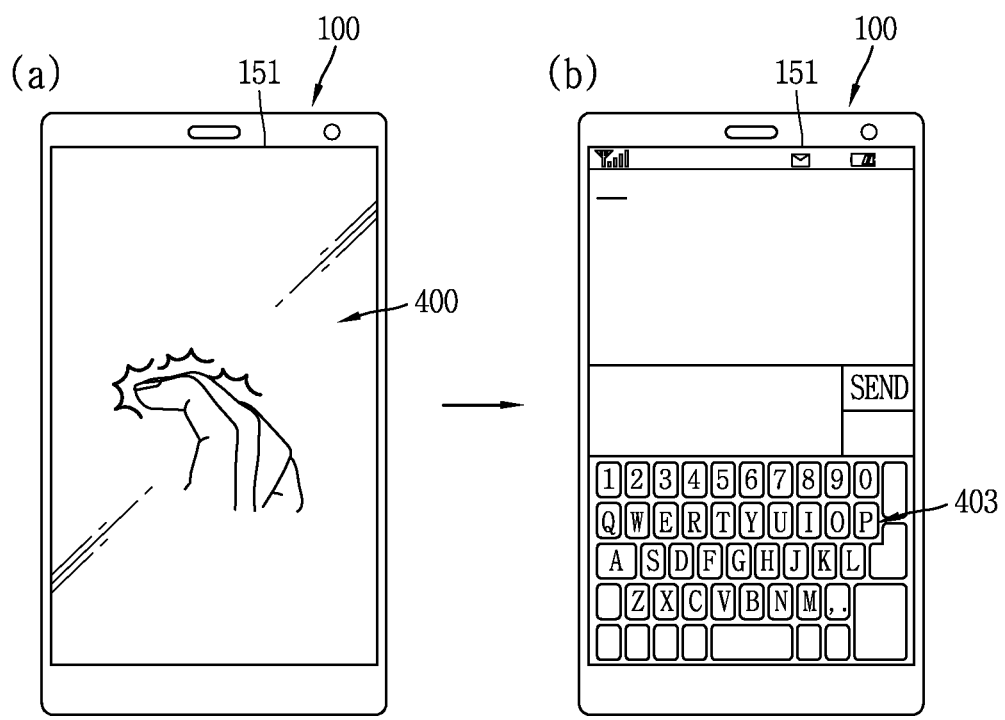

In addition, as another example, when the tap with the first property and the second property (for example, the tap that is sequentially applied to different regions), as illustrated in FIG. 4H(a), the controller 180 performs a function that is matched to the second property. For example, if the tap with the second property is sequentially applied to different regions, the controller outputs a virtual keyboard (or a visual keyboard, 403) for inputting information. On the other hand, the tap that is sequentially applied to different regions is like an operation in which the user inputs information through the user of a keyboard. If the tap that corresponds to such an operation is detected, the controller 180 provides the user with more-friendly user experience (EX) by outputting the keyboard.

As described above, the user of the mobile terminal according to the present invention can control the mobile terminal only by tapping on the mobile terminal in the state where the display unit is inactivated. That is, the mobile terminal according to the present invention provides the user with a more-intuitive, comparatively-simple user interface environment.

Figure 6A:
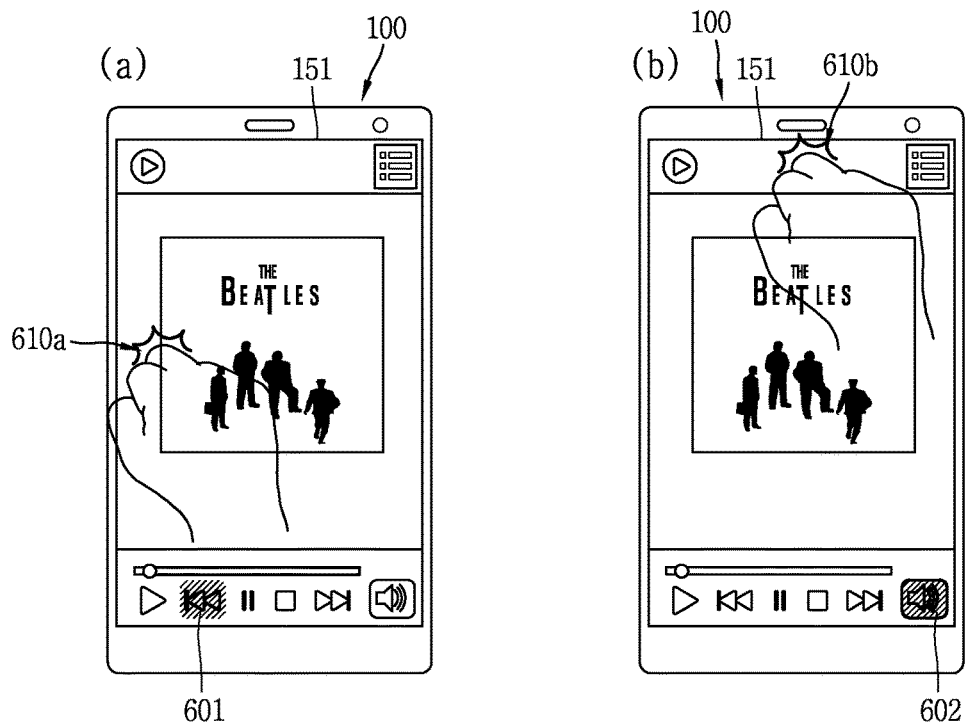
FIGS. 6A(a) and 6A(b), FIG. 6B(b), and FIGS. 6C(a) and 6C(b) are diagrams for describing a method in which in the mobile terminal according to one embodiment of the present invention, a function associated with a function that is being currently executed is executed corresponding to a tap.

An example in which the control method described referring to FIG. 3 is applied in the state where the display unit is activated is described in detail below referring to the accompanying drawings. FIGS. 6A(a) and 6A(b), FIG. 6B(b), FIGS. 6C(a) and 6C(b), and FIGS. 7A and 7B are diagrams for describing a method in which in the mobile terminal according to one embodiment of the present invention, a function associated with a function that is being currently executed is executed corresponding to the tap.

In the mobile terminal according to the present invention, if the tap is applied to the main body of the mobile terminal or the object in the state where the display unit is activated, the screen information displayed on the display unit or the application corresponding to the screen information is controlled. For example, the controller 180 changes the setting of the application corresponding to the screen information or changes the setting information on the information that is output through such an application. Furthermore, the controller 180 performs different control operations according to the position to which such a tap is applied.

For example, if the left side 610a of the display unit 151, as illustrated in FIG. 6A(a), is tapped on in a state where the music reproducing application runs and the screen information corresponding to the running music reproducing application is output, the controller 180 reproduces back the music that has been reproduced before the music being currently reproduced is reproduced. In this case, in order to make a currently controlled function known, the controller 180 displays an icon 601 (or a graphic object) corresponding to the currently controlled function in such a manner to differentiate the icon 601 (or the graphic object) from other icons. That is, highlighting processing is performed on the icon 601. For example, blinking processing, emphasizing processing, color-changing processing, or the like is performed on the icon 601 in order for the icon 601 to exhibit a visual effect.

In addition, as illustrated in FIG. 6A(b), if the upper region 610b of the display unit 151 is tapped on in the state where the music reproducing application runs and the screen information corresponding to the music reproducing application that runs is output, the controller 180 increases the volume. In this case, in order to make a currently controlled function known, the controller 180 displays an icon 602 (or a graphic object) corresponding to the currently controlled function in such a manner to differentiate the icon 602 (or the graphic object) from other icons. That is, the highlighting processing is performed on the icon 602. For example, the blinking processing, the emphasizing processing, the color-changing processing, or the like is performed on the icon 602 in order for the icon 602 to exhibit the visual effect.

Figure 6B:
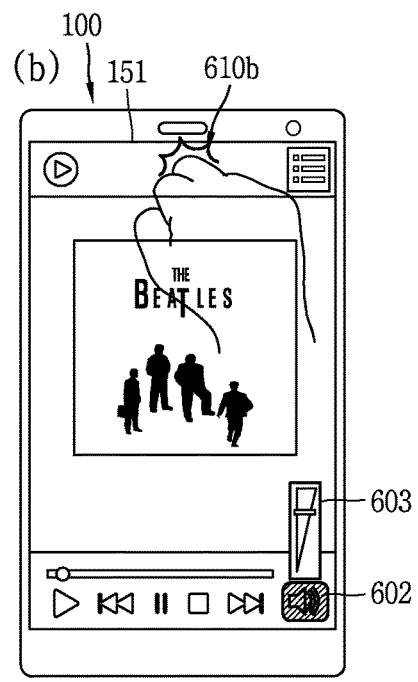
Figure 7:
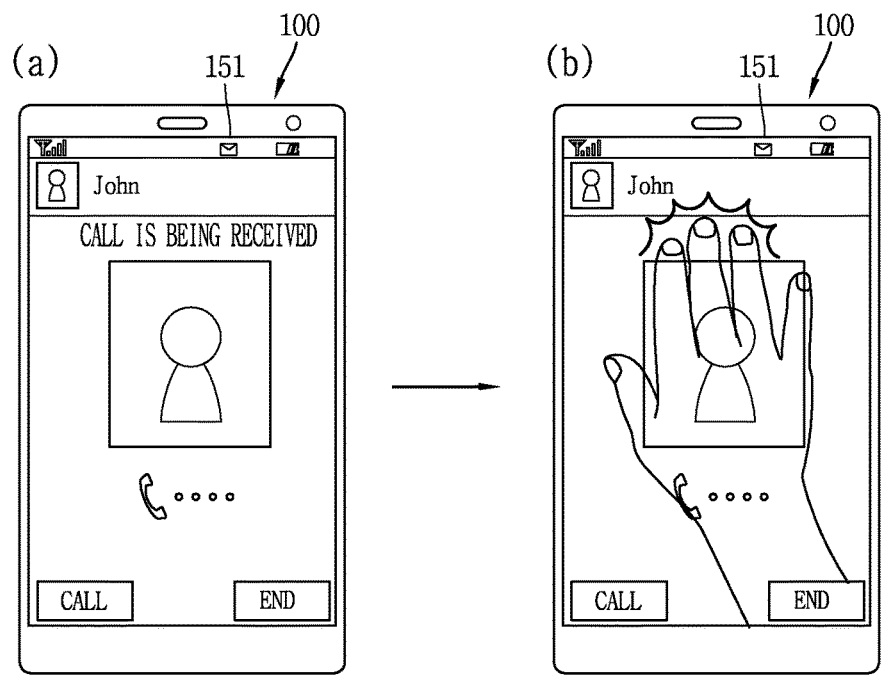
FIGS. 7A and 7B are diagrams for describing a method in which in the mobile terminal according to one embodiment of the present invention, a function associated with a function that is being currently executed is executed corresponding to a tap.

In addition, in order to make a volume level known, the controller 180 outputs a volume-adjusting progress bar 603 as illustrated in FIG. 6B. The volume-adjusting progress bar 603 indicates a currently-set volume level. Corresponding to the tap, the controller 180 controls the display unit 151 in such a manner that a visual appearance of the volume-adjusting progress bar 603 is changed depending on the tap, in order to make the changing of the previously-set volume known.

On the other hand, although not illustrated, if the right-side region of the display unit 151 is tapped on, the controller 180 switches directly to music to be reproduced in succession to the music being currently reproduced. Then, if the lower region of the display unit 151 is tapped on, the controller 180 decreases the volume.

In this manner, in the mobile terminal according to the present invention, different control operations are performed depending on the taps that are applied to different positions. In addition, the different positions are positions that normally is recognized in a conceptional manner, and because of this, the controller 180 can provide the user with more-friendly user experience (UX).

On the other hand, although not illustrated, the controller varies the extent of control depending on impact force (strength) of the tap. For example, if the tap for adjusting the volume is detected, the controller 180 performs control in such a manner that the extent with which the volume is adjusted varies depending on the impact force of the tap. As a more specific example, if the tap with an impact force level of "1" is detected, the controller 180 increases the volume by one step. If the tap with the impact force level of "3" greater than the impact force level of "1," the controller 180 increases the volume by "three" steps.

Figure 6C:
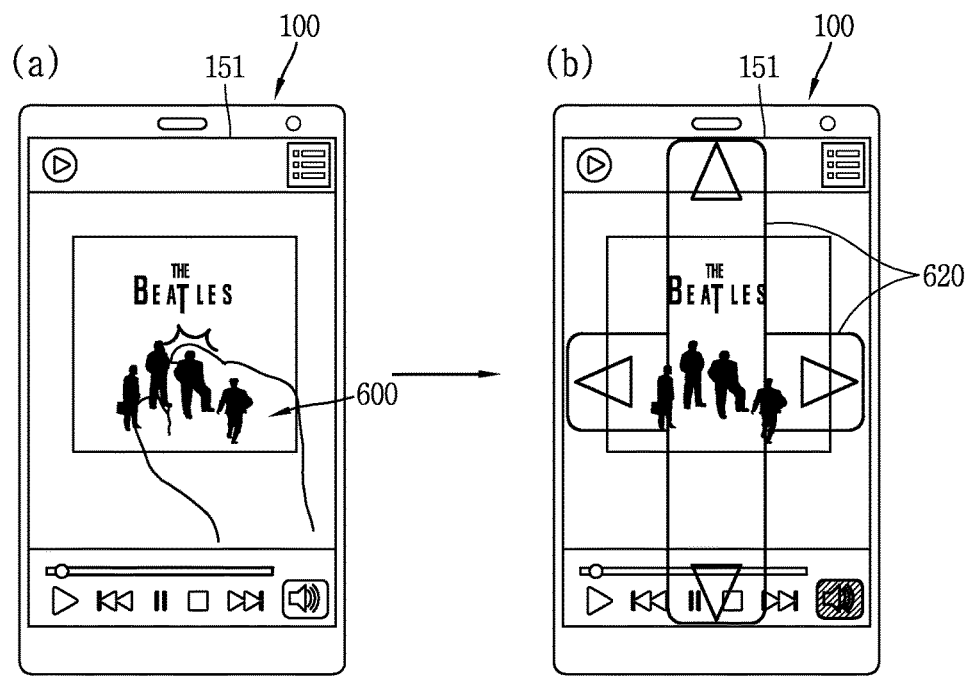

In addition, when the first tap with respect to an arbitrary one region 600 is detected as illustrated in FIG. 6C(a), the controller 180 outputs guide information 620 on the function to be controlled according to the applying of the second tap, as illustrated in FIG. 6C(b). The guide information is guide information on the position to which the second tap is applied or information on the function that is to be controlled according to the second tap. In addition, the guide information is output in at least one of visual, audio, and haptic ways.

Another example is described in which if the tap is applied to the main body of the mobile terminal or the object in the state where the display unit is activated, the screen information that is output on the display unit or the application that corresponds to the screen information is controlled. In the example, as illustrated in FIGS. 7A and 7B, the controller 180 controls the function associated with an event that is currently received. For example, if the tap, as illustrated in FIG. 7A, is detected in a state where a call receiving event occurs and the screen information corresponding to the occurrence of the call receiving event is output, the controller 180, as illustrated in FIG. 7B, controls a function associated with the call receiving event, corresponding to the tap.

For example, the controller 180 refuses to receive the call, corresponding to the tap. That is, the controller 180 executes a "call-receiving refusing function," corresponding to the tap. In addition, the controller 180 controls different functions, corresponding to an area to which the tap is applied. For example, if the tap is applied to a predetermined area or above, the controller 180, as illustrated in FIG. 7B, executes the call-receiving refusing function. In addition, if the tap is applied to less than the predetermined area, the controller 180 performs an "automatic answering function." In addition, as described above, the controller 180 controls different functions associated with the received event, according to the position to which the tap is applied and the impact force by which the tap is applied.

As described above, in the mobile terminal according to the present invention, corresponding to the tap that is applied not only in the state where the display unit 151 is inactivated, but also in the state where the display unit 151 is activated, the function associated with the screen information that is output on the display unit 151 is controlled. Therefore, the user can easily execute the function described above, only by tapping on the main body of the mobile terminal or the neighboring object.

Figure 8A:
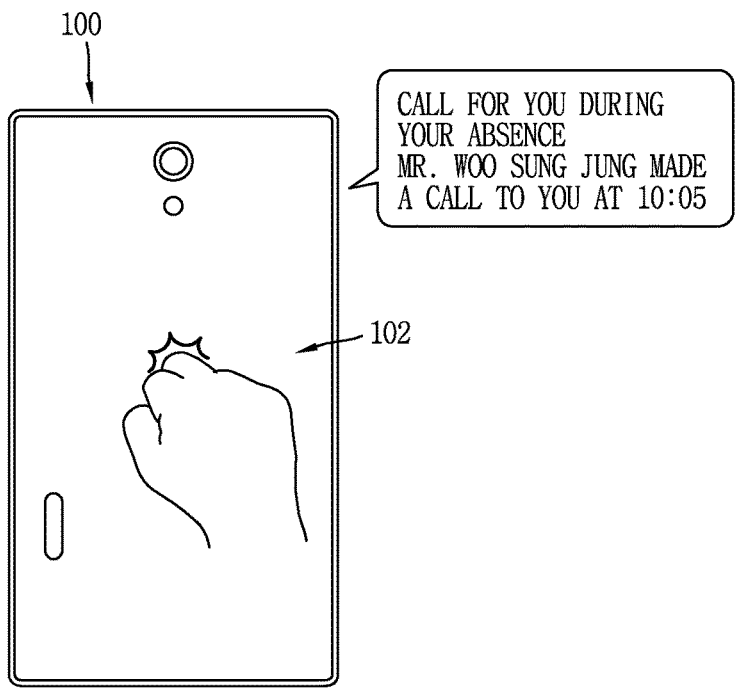
FIG. 8A, FIG. 8B, FIGS. 8C(a) and 8C(b), FIGS. 8D(a) and 8D(b), FIGS. 8E(a) and 8E(b), FIGS. 8F(a) and 8F(b), and FIGS. 8G(a) to 8G(c) are diagrams for describing a method in which in the mobile terminal according to one embodiment of the present invention, a function according to a position in which the mobile terminal is tapped on is executed.
Figure 8B:
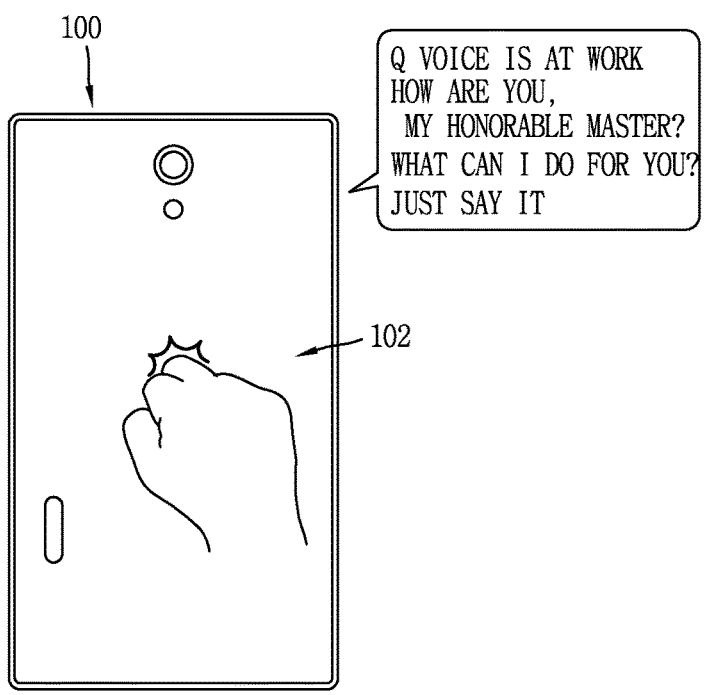
Figure 8C:
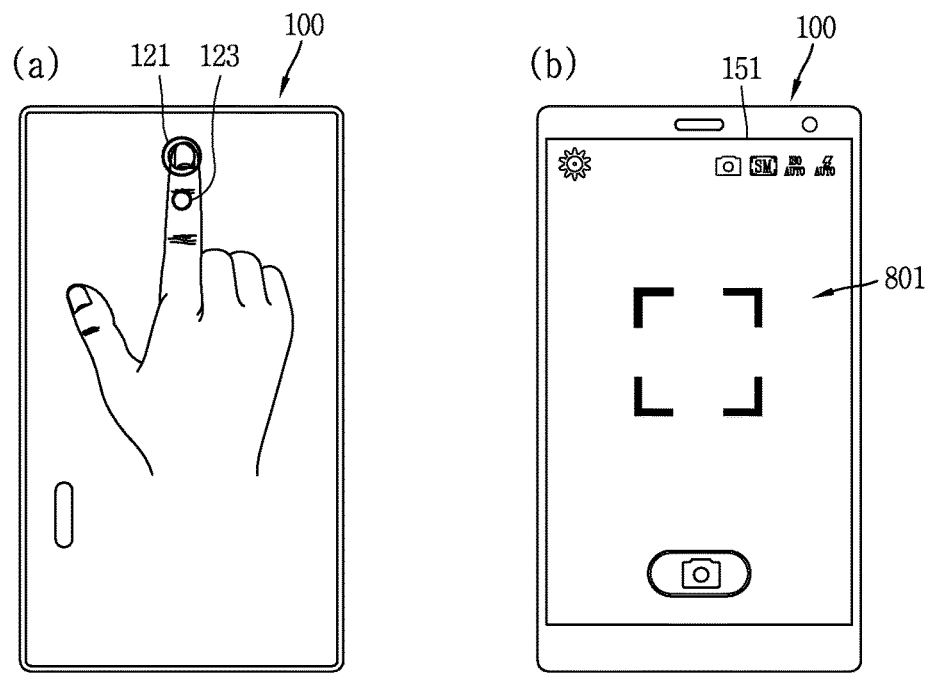

A method in which if a particular position is tapped on, a function associated with the corresponding position is controlled is described in detail below referring to the control method described referring to FIG. 3 and to the accompanying drawings. FIG. 8A, FIG. 8B, FIGS. 8C(a) and 8C(b), FIGS. 8D(a) and 8D(b), FIGS. 8E(a) and 8E(b), FIGS. 8F(a) and 8F(b), and FIGS. 8G(a) to 8G(c) are diagrams for describing the method in which in the mobile terminal according to one embodiment of the present invention, the function according to the position in which the mobile terminal is tapped on is executed.

In the mobile terminal according to the present invention, different functions are controlled according to hardware characteristics of the mobile terminal, which corresponds to the position to which the tap is applied. For example, as illustrated in FIG. 8A and FIG. 8B, a rear case 103 of the main body 100 of the mobile terminal is tapped on, the controller 180 executes a function associated with "voice."

That is, when the rear case 103 is tapped on, there is a high likelihood that the display unit 151 will not be currently used, and because of this. Therefore, in this case, the function associated with the "voice," is executed to increase user convenience.

As illustrated in FIG. 8A, the controller 180 outputs current-status information on the mobile terminal (for example, event receiving information, current time information, weather information, and status information on the mobile terminal (information on battery, communication status, location and others)) by voice. In addition, the controller 180 executes the voice recognition function as illustrated in FIG. 8B. In addition, as illustrated in FIG. 8A, the controller 180 consecutively executes the voice recognition function after the status information is complete.

In addition, the outputting of the status information or the voice recognition function is terminated corresponding to the additional applying of the tap to the rear case 103.

In addition, if the voice is not input within predetermined time after the voice recognition function is executed, the voice recognition function is terminated.

As another example, corresponding to the tapping-on of the camera 121 or of surroundings of a region in which the camera 121 is located as illustrated in FIG. 8C(a), the controller 180, as illustrated in FIG. 8C(b), activates a camera function. In this case, the controller 180 outputs a camera-functioning screen 801 even though the mobile terminal is in the locked state.

Figure 8D:
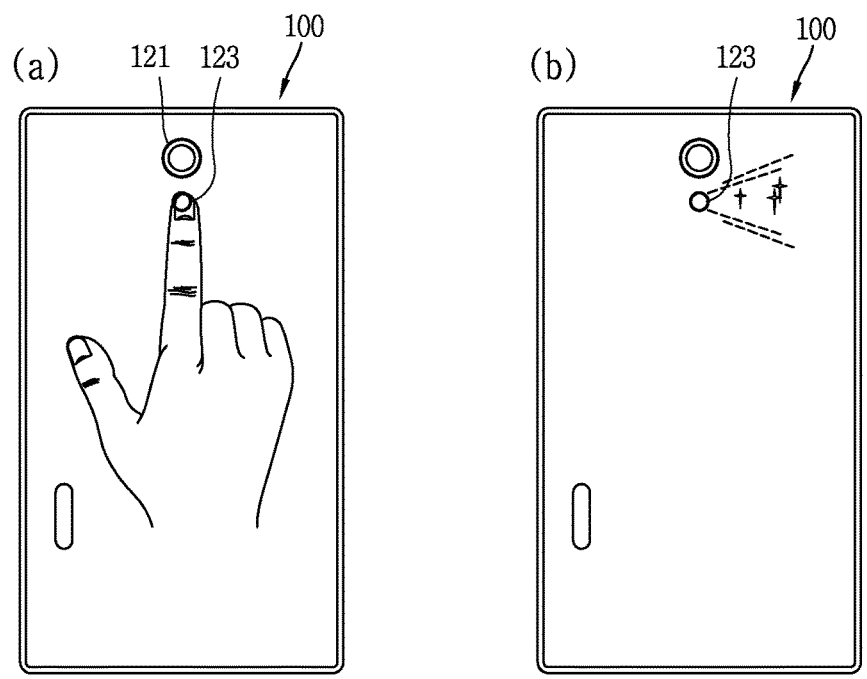

In addition, corresponding to the tapping-on of a flash 123 or of surroundings of a region in which the flash 123 is located as illustrated in FIG. 8D(a), the controller 180, as illustrated in FIG. 8D(b), activates a flash function.

Figure 8E:
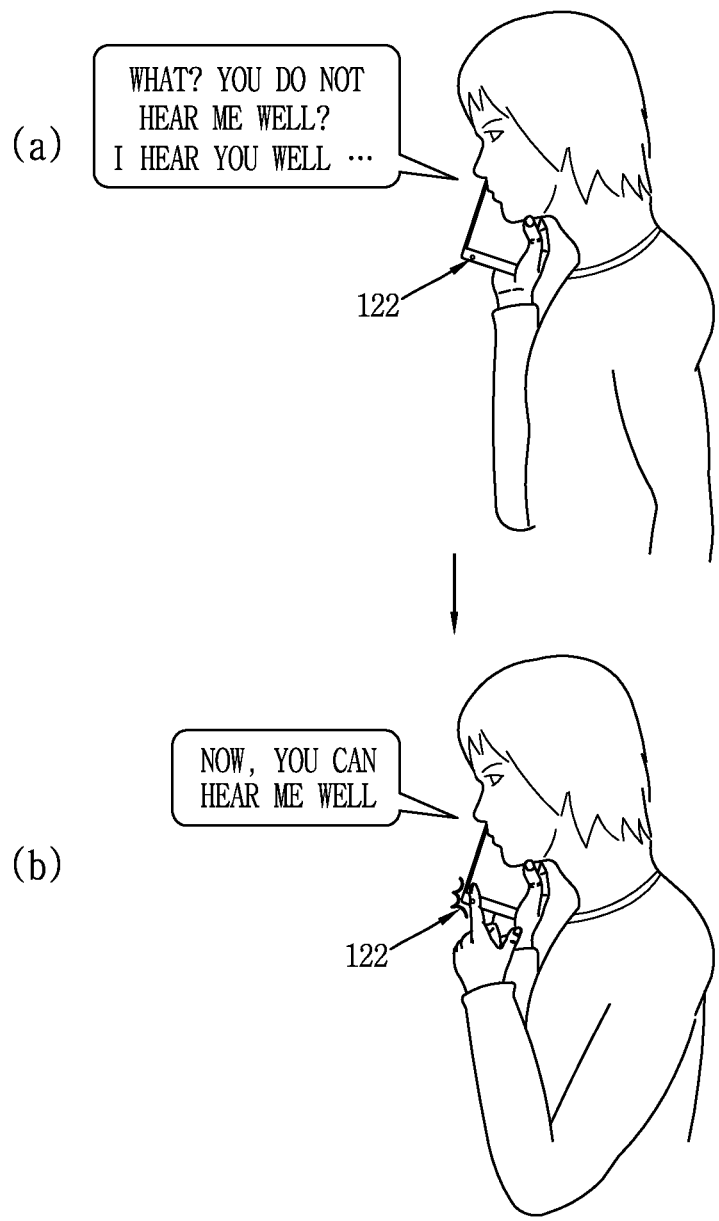

In addition, corresponding to the tapping-on of a microphone 122 or of surroundings of a region in which the microphone 122 is located as illustrated in FIG. 8E(a), the controller 180, as illustrated in FIG. 8E(b), improves the receive sensitivity of the microphone or adjust a size of the audio information that is transferred to the other party's terminal.

Figure 8F:
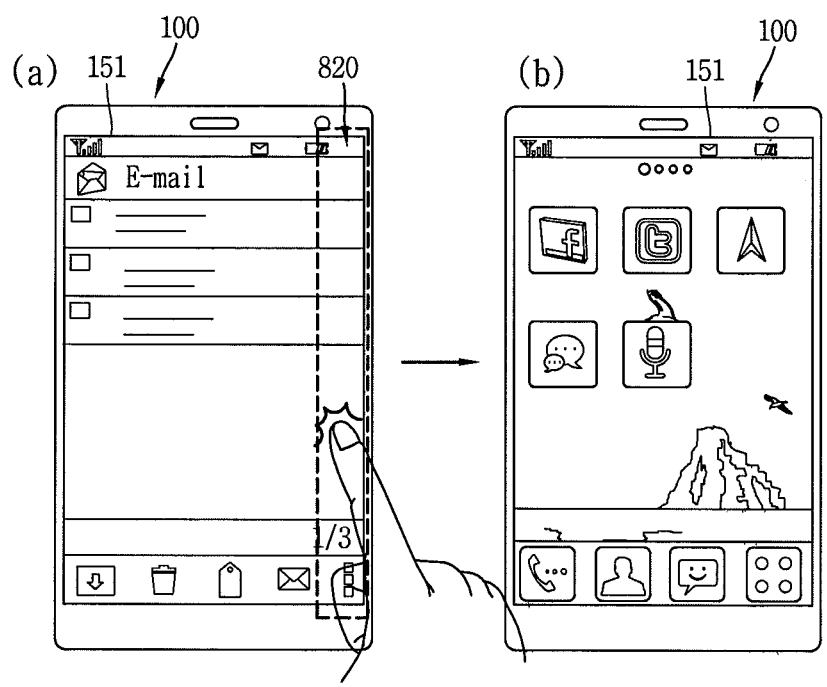

In addition, as illustrated in FIGS. 8F(a) and 8F(b), if the tap corresponding to a predetermined condition is applied to a predetermined region 820 of the main body 100, the controller 180 terminates at least one of the applications that runs on the terminal.

In the mobile terminal according to the present invention, the concurrent running of multiple applications is possible. If the tap corresponding to the predetermined condition is applied to the predetermined region 820 of the main body, the controller, as illustrated in FIG. 8F(b), terminates at least one of the running multiple applications.

In addition, each time the tap corresponding to the predetermined condition is applied, the controller 180 sequentially terminates the running multiple applications.

Figure 8G:
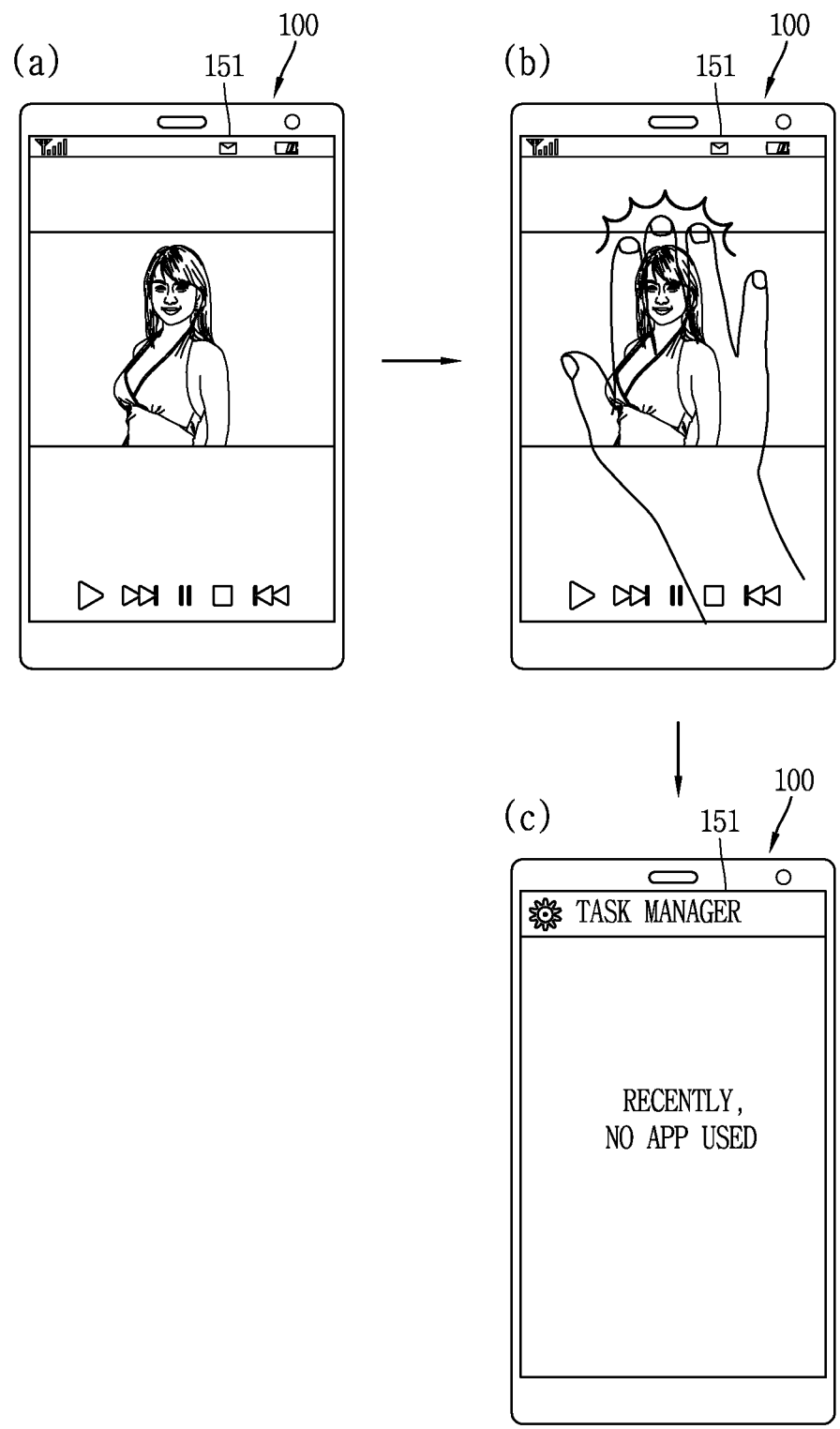

In addition, as illustrated in FIGS. 8G(a) to 8G(c), corresponding to the tapping-on of the predetermined area or above of the display unit 151, the controller 180 terminates at least one of the applications that run on the terminal.

Figure 9A:
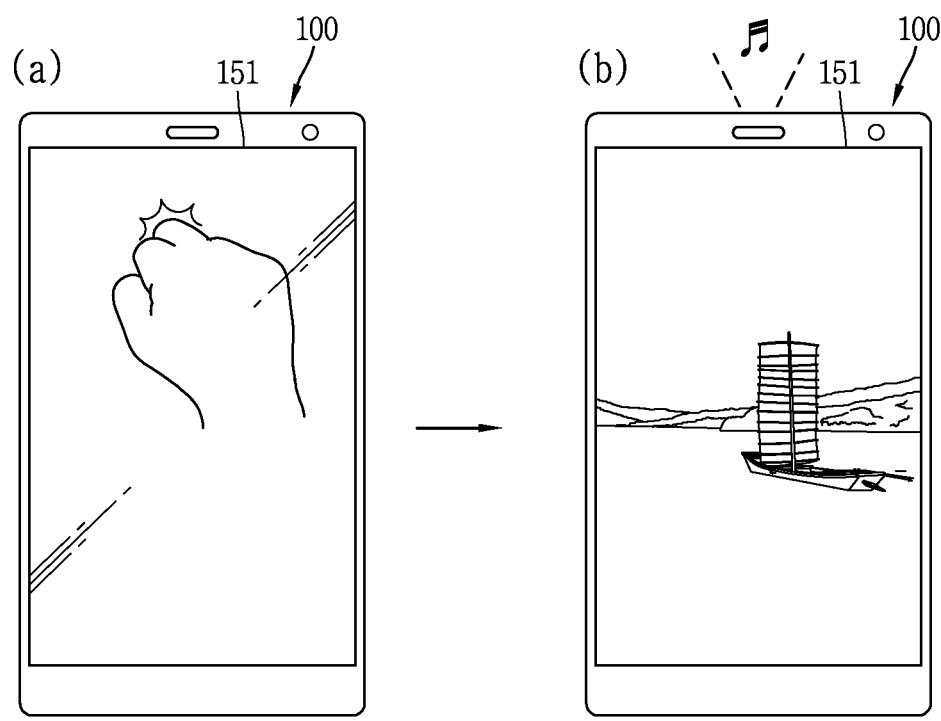
FIGS. 9A(a) and 9A(b) and FIGS. 9B(a) to 9B(c) are diagrams for describing a method of controlling the mobile terminal corresponding to tapping-on of the mobile terminal in a particular situation in the mobile terminal according to one embodiment of the present invention.

A method in which if the mobile terminal is tapped on in a particular situation, a function suitable for the corresponding particular situation is controlled is described in detail below referring to the control method described referring to FIG. 3 and to the accompanying drawings. FIGS. 9A(a) and 9A(b), FIFGS. 9B(a) to 9B(c), FIGS. 10A and 10B, and FIGS. 11A and 11B are diagrams for describing the method of controlling the mobile terminal corresponding to the tapping-on of the mobile terminal in a particular situation in the mobile terminal according to one embodiment of the present invention.

In the mobile terminal according to the present invention, according to a property of the tapping instrument or a property of the tap, a function that is in advance matched to the corresponding property is immediately performed.

For example, when the main body of the terminal, as illustrated in FIG. 9A(a), is tapped on with predetermined impact force or above, the controller 180, as illustrated in FIG. 9A(b), outputs at least one of the music and the image. At this point, the music and the image that are input are in advance set by the user or are automatically selected by the controller 180. For example, the controller 180 performs the control in such a manner that types of music and image vary according to the extent of impact force of the tap. For example, if the strength of the tap is great, peaceful music is output.

Figure 9B:
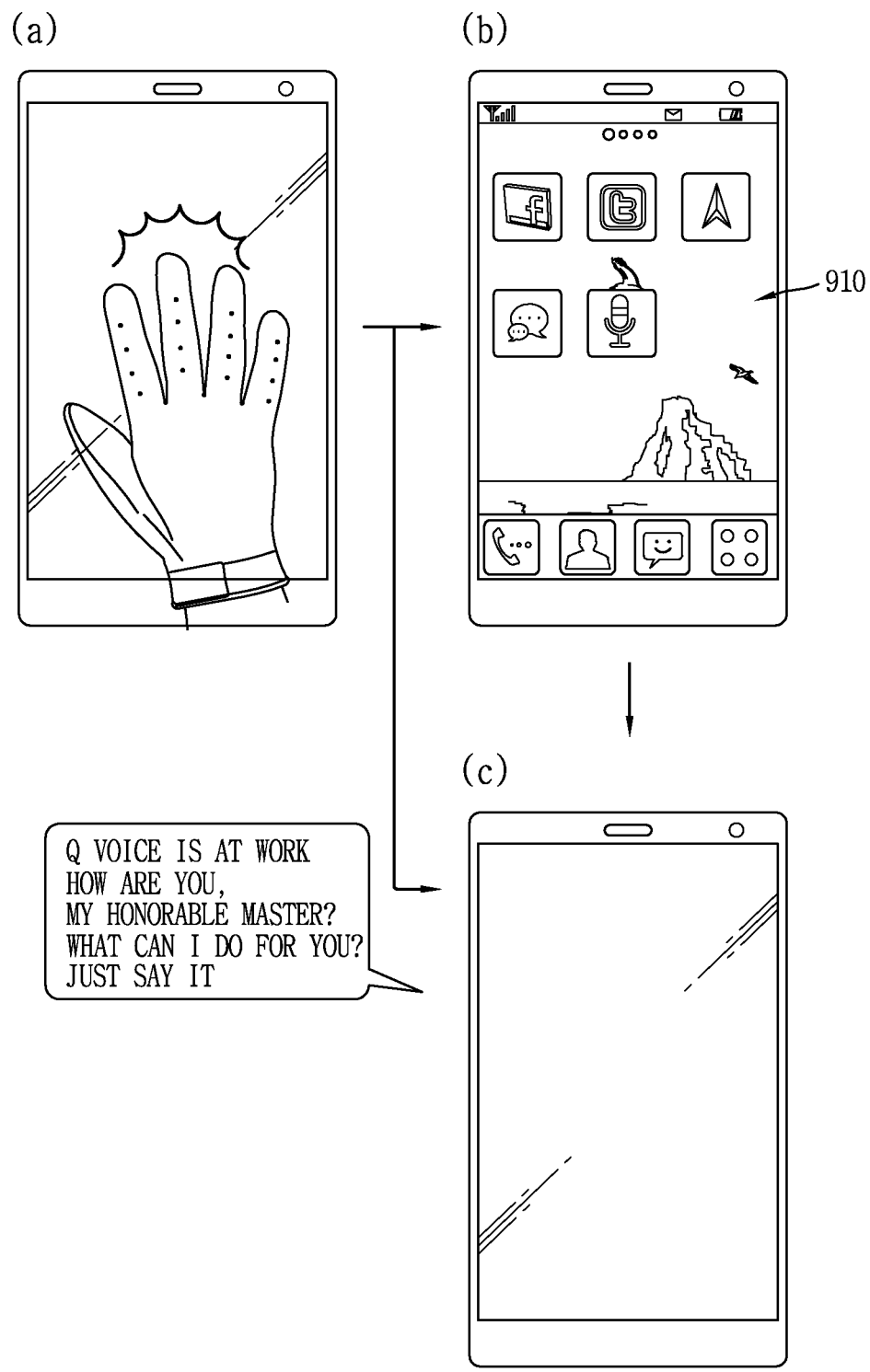

In addition, if the main body 100 of the terminal (or the display unit 151), as illustrated in FIG. 9B(a), is tapped on with the tapping instrument with which the recognition of the touch is impossible, the controller 180, as illustrated in FIG. 9B(b), immediately cancels the locked state, or as illustrated in FIG. 9B(c), executes the voice recognition function. At this point, the tapping instrument with which the recognition of the touch is impossible may be a finger of the user who wears a glove.

Figure 10:
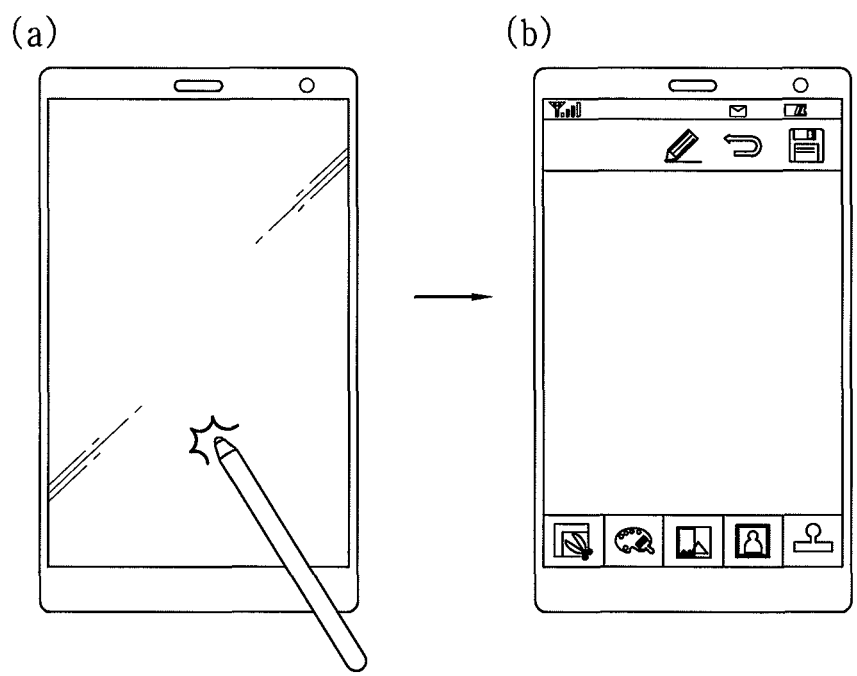
FIGS. 10A and 10B are diagrams for describing a method of controlling the mobile terminal corresponding to tapping-on of the mobile terminal in a particular situation in the mobile terminal according to one embodiment of the present invention.

In addition, if the main body 100 of the terminal (or the display unit 151), as illustrated in FIG. 10A, is tapped on with a touch pen (or a stylus pen), the controller 180, as illustrated in FIG. 10B, immediately activates a memo function (or a memo application).

Figure 11A:
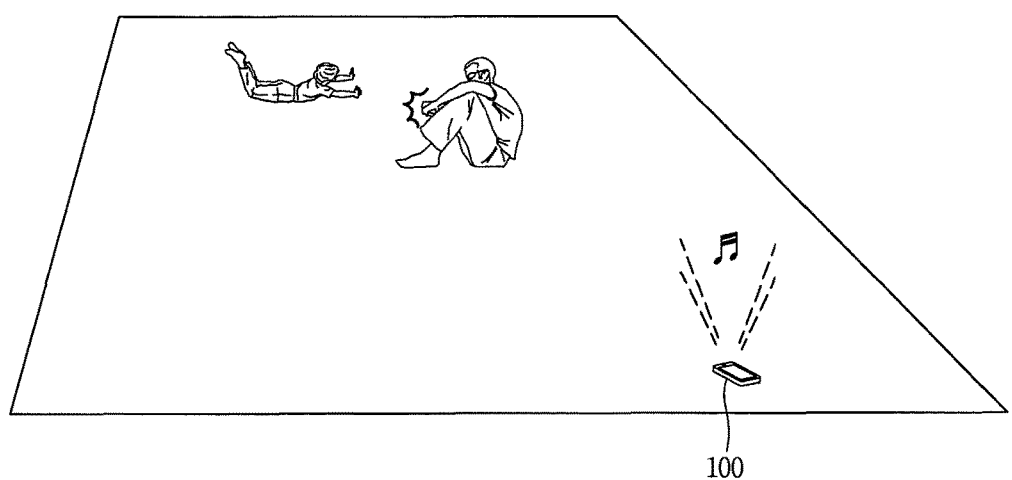
FIGS. 11A and 11B are diagrams for describing a method of controlling the mobile terminal corresponding to tapping-on of the mobile terminal in a particular situation in the mobile terminal according to one embodiment of the present invention.

In addition, if the tap is applied to a neighboring object other than the main body 100 of the mobile terminal, as illustrated in FIG. 11A, the controller 180 outputs the alarm information. That is, in the mobile terminal according to the present invention, if the user does not know where his/her terminal is located, when the neighboring object is tapped on, the alarm information is output in order to let him/her know where his/her terminal is located. The alarm information is output in at least one of visual, haptic (for example, vibration), and audio ways.

In this case, only if the tap with respect to the neighboring object is detected beyond predetermined distance, or is detected within the predetermined distance, from the main body of the terminal, the alarm information is output.

Figure 11B:
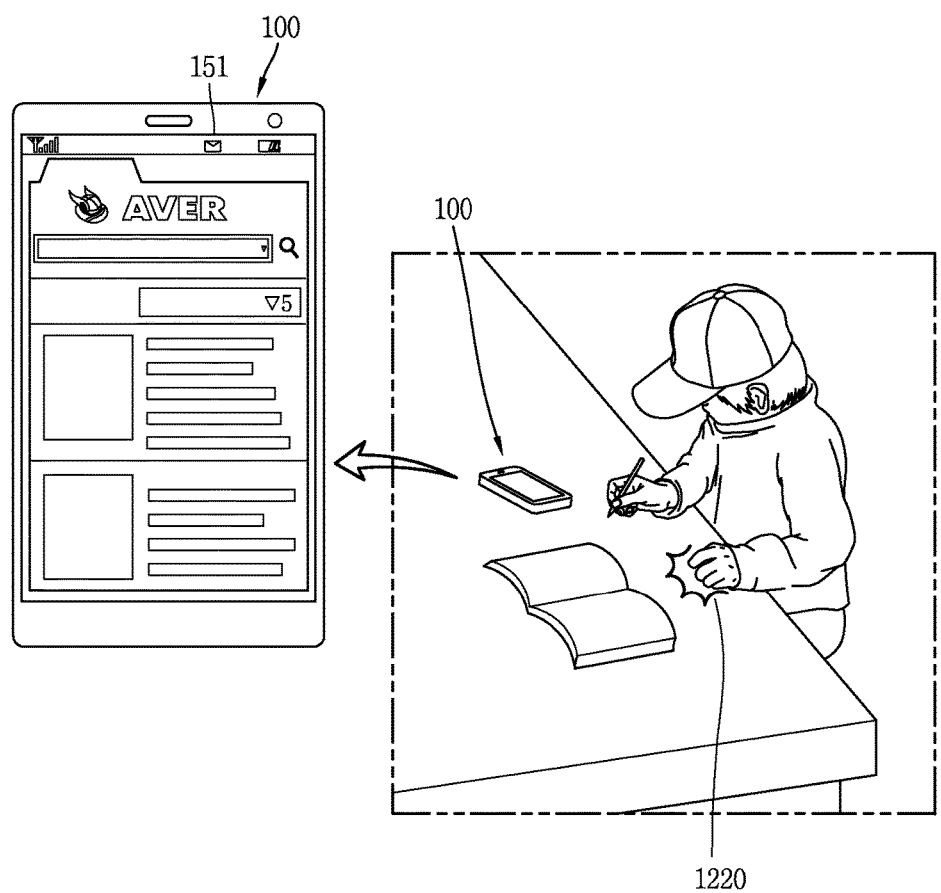

In addition, if the tap, as illustrated in FIG. 11B, is applied to a neighboring object 1220 other than the main body 100 of the mobile terminal in the state where the illumination of the display unit 151 is turned on, the controller 180 continuously turns on the illumination of the display unit 151. Therefore, if the user continuously uses the information that is output on the display unit 151, he/she can simply extend a period of time for which the illumination of the display unit 151 is turned on, only by tapping on surroundings of the main body 100 without touching on directly the display unit 151, in order to extend the period of time for which the illumination of the display unit 151 is turned on.

As described above, in the mobile terminal according to the present invention, proper control is performed according to a situation of the user, or a situation of the mobile terminal, and thus the user convenience can be improved.

In addition, the mobile terminal according to one embodiment of the present invention controls the functions of the mobile terminal, corresponding to the tap on the terminal. Therefore, even though the user does not operate the mobile terminal through the multiple-times touching on of the mobile terminal, he/she can use the user interface that can conveniently control the functions of the mobile terminal.

In addition, the mobile terminal according to one embodiment of the present invention can control different functions or change different setting information according to the positions to which the tap is applied. Therefore, the user can control various functions only by applying the tap to various positions and thus tapping on the mobile terminal.

In addition, according to one embodiment disclosed in the present specification, the method described above may be realized by being stored as processor-readable codes in a program-stored medium. A ROM, a RAM, a CD-ROM, a magnetic tape, a floppy disk, an optical data storage device and the like are examples of the processor-readable medium, and the processor-readable medium may be realized in the form of a carrier wave (for example, a transmission over the Internet).

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
   a main body;
   a touch screen located in the main body;
   a sensor that senses a tap on the touch screen, wherein the sensor comprises at least one of an acceleration sensor and a touch sensor; and
   a controller configured to:
   sense, via the sensor, one or more taps applied to the touch screen in a state where the mobile terminal is in a locked state and the touch screen is in an inactivated state, and
   determine whether an object that applies the one or more taps on the touch screen has conductivity in response to the one or more taps, execute one of different functions according to a type of the object,
   wherein when the object has no conductivity based on the determination, the controller executes a voice recognition function while the touch screen is in the inactivated state such that the mobile terminal is controlled by a voice input, and
   wherein when the object has conductivity based on the determination, the controller controls the touch screen to activate such that the mobile terminal is controlled by a touch input applied to the touch screen.

2. The mobile terminal of claim 1, wherein if the tap is detected a predetermined number of times within a predetermined time, the controller changes a setting value for any one of the functions that run on the terminal, and the changed setting value relates to information that is output to and is input from a position that corresponds to the position to which the tap is applied.

3. The mobile terminal of claim 2, further comprising:
   a microphone that is located in the main body and configured to receive voice information; and
   a speaker that is formed on the main body and configured to output audio information,
   wherein in a state where the microphone and the speaker are all activated, when the tap is applied to surroundings of a region in which the microphone is located, the controller changes a setting value associated with the microphone, and when the tap is applied to surroundings of a region in which the speaker is located, the controller changes a setting value associated with the speaker.

4. The mobile terminal of claim 3, wherein the controller performs control in such a manner that the extent to which the setting value is changed varies depending on strength with which the tap is applied.

5. The mobile terminal of claim 1, wherein the terminal includes multiple input and output constituent elements, and
wherein the controller performs control of whether or not to activate the constituent element located in the position to which the tap on the main body is applied.

6. The mobile terminal of claim 5, wherein if a camera is located in the position to which the tap is applied, the camera is activated or inactivated, and
wherein if a flash is located in the position to which the tap is applied, the flash is activated or inactivated.

7. The mobile terminal of claim 1, wherein concurrent running of multiple applications on the terminal is possible, and
wherein if the tap corresponding to a predetermined condition is applied to a predetermined region of the main body, the controller terminates at least one of the running multiple applications.

8. The mobile terminal of claim 7, wherein the controller sequentially terminates the running multiple applications each time the tap corresponding to the predetermined condition is applied.

9. A method of controlling a mobile terminal, the method comprising:
sensing, via a sensor, one or more taps applied to a touch screen in a state where the mobile terminal is in a locked state and the touch screen is in an inactivated state;
determining whether an object that applies the one or more taps on the touch screen has conductivity in response to the one or more taps; and
executing one of different functions according to a type of the object,
wherein when the object has no conductivity based on the determining, the method further comprises executing a voice recognition function while the touch screen is in the inactivated state such that the mobile terminal is controlled by a voice input, and
wherein when the object has conductivity based on the determining, the method further comprises controlling the touch screen to activate such that the mobile terminal is controlled by a touch input applied to the touch screen.

\* \* \* \* \*